(12) United States Patent
Fujiwara et al.

(10) Patent No.: US 11,269,220 B2
(45) Date of Patent: Mar. 8, 2022

(54) POLARIZED-LIGHT IRRADIATION DEVICE AND METHOD FOR MANUFACTURING LIQUID CRYSTAL DISPLAY DEVICE

(71) Applicant: SHARP KABUSHIKI KAISHA, Sakai (JP)

(72) Inventors: Seiji Fujiwara, Sakai (JP); Takashi Sonoda, Sakai (JP); Nobufumi Tomimaru, Sakai (JP); Hitoshi Watanabe, Sakai (JP); Shinichi Terashita, Sakai (JP); Fumikazu Shimoshikiryoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 606 days.

(21) Appl. No.: 16/309,393

(22) PCT Filed: Jun. 7, 2017

(86) PCT No.: PCT/JP2017/021126
§ 371 (c)(1),
(2) Date: Dec. 12, 2018

(87) PCT Pub. No.: WO2017/217300
PCT Pub. Date: Dec. 21, 2017

(65) Prior Publication Data
US 2019/0258121 A1  Aug. 22, 2019

(30) Foreign Application Priority Data
Jun. 14, 2016  (JP) ............................ JP2016-118085

(51) Int. Cl.
*G02F 1/13* (2006.01)
*G02F 1/1337* (2006.01)
(Continued)

(52) U.S. Cl.
CPC ..... *G02F 1/133788* (2013.01); *G02B 5/3025* (2013.01); *G02B 5/3033* (2013.01);
(Continued)

(58) Field of Classification Search
CPC . G02B 27/18; G02B 27/283; G02F 1/133788; G02F 1/133753; G02F 1/133742; H04N 9/3167; H04N 9/3108
See application file for complete search history.

(56) References Cited

U.S. PATENT DOCUMENTS

2002/0033442 A1  3/2002 Toko et al.
2002/0159014 A1* 10/2002 Tasaka ............... G02F 1/133788
                                                349/124
2004/0179158 A1*  9/2004 Silverstein ........... G02B 27/283
                                                349/117

FOREIGN PATENT DOCUMENTS

JP    2002-082333 A    3/2002
JP    2005-234266 A    9/2005
(Continued)

*Primary Examiner* — Robert H Kim
*Assistant Examiner* — Hsien C Tsai
(74) *Attorney, Agent, or Firm* — ScienBiziP, P.C.

(57) ABSTRACT

The present invention provides a polarized light irradiation device capable of setting an alignment azimuth angle θ of liquid crystal molecules to be a desired angle even when the incident angle of polarized light on a substrate is not 0° in irradiation of a photo alignment film with polarized light, and a method for manufacturing a liquid crystal display device by using the polarized light irradiation device. The polarized light irradiation device is used in alignment treatment of a photo alignment film provided on a substrate, the device including: a stage including a placement surface on which the substrate is placed; and a polarized light irradiation unit configured to irradiate the placement surface with polarized light through a polarizer in a direction tilted relative to the normal of the placement surface, wherein a
(Continued)

polarization azimuth angle α, which is an angle of the polarization axis of the polarizer when the polarization axis of the polarizer is projected onto the placement surface, satisfies $30°<\alpha<45°$, $45°<\alpha<60°$, $-60°<\alpha<-45°$, or $-45°<\alpha<-30°$, as viewed in an irradiation axis direction of the polarized light with the longitudinal direction of the substrate taken to be 0°.

3 Claims, 20 Drawing Sheets

(51) Int. Cl.
  *G02B 5/30* (2006.01)
  *G02B 27/28* (2006.01)
(52) U.S. Cl.
  CPC ......... *G02B 27/286* (2013.01); *G02F 1/1303* (2013.01); *G02F 1/1337* (2013.01)

(56) References Cited

FOREIGN PATENT DOCUMENTS

| | | | |
|---|---|---|---|
| JP | 2006-133498 A | | 5/2006 |
| JP | 2006133498 A | * | 5/2006 |
| JP | 2011-085738 A | | 4/2011 |
| JP | 2016-024297 A | | 2/2016 |

* cited by examiner

Fig. 6

| | Polarizer polarization azimuth angle $\alpha$ | Substrate irradiation azimuth angle (long axis) $\phi 1$ | Substrate irradiation azimuth angle (short axis) $\phi 2$ | Substrate irradiation azimuth angle (after vector synthesis) $\phi v$ |
|---|---|---|---|---|
| Example 1 | 52.6° | 45.0° | 30.4° | 44.3° |
| Example 2 | 51.0° | 43.4° | 31.8° | 42.7° |
| Figure | (α, α1, α2 diagram) | ($\phi 1$ diagram) | ($\phi 2$ diagram) | ($\phi v$ diagram) |

Fig. 9
(a)
(b)
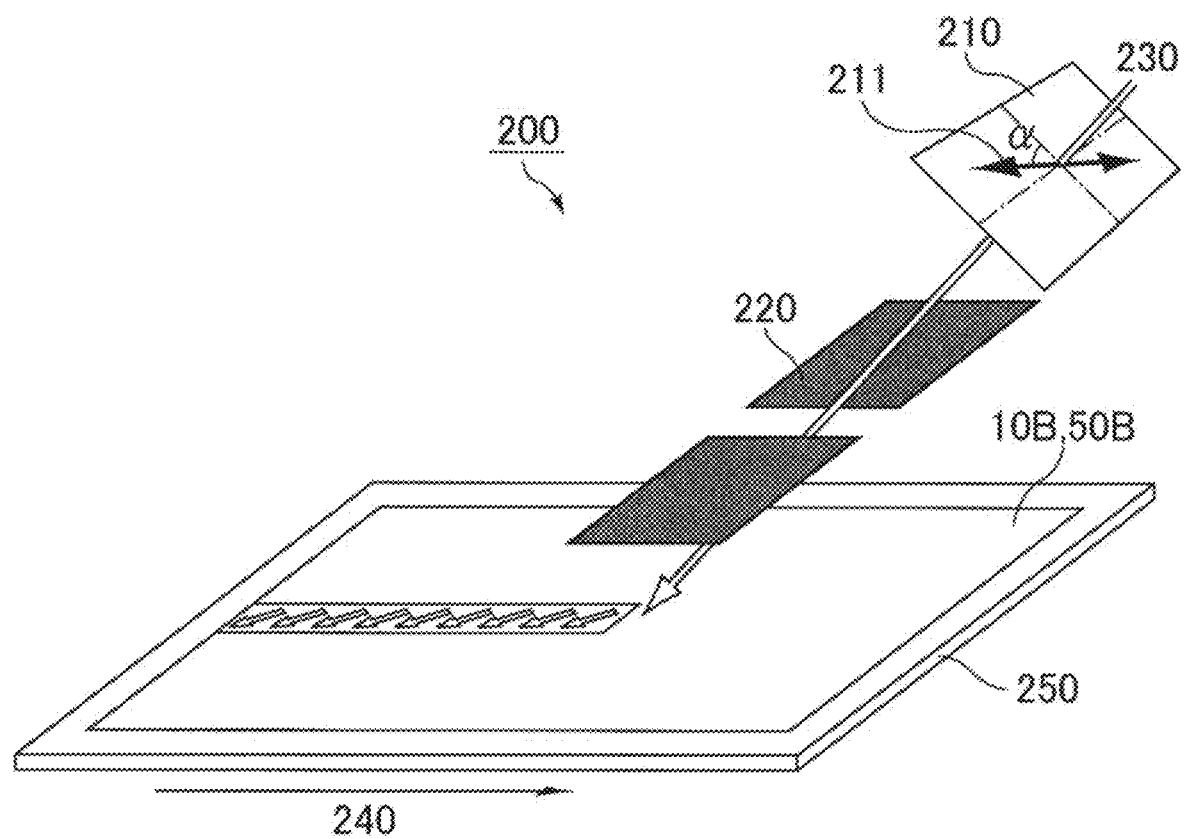

Fig. 24
(a)
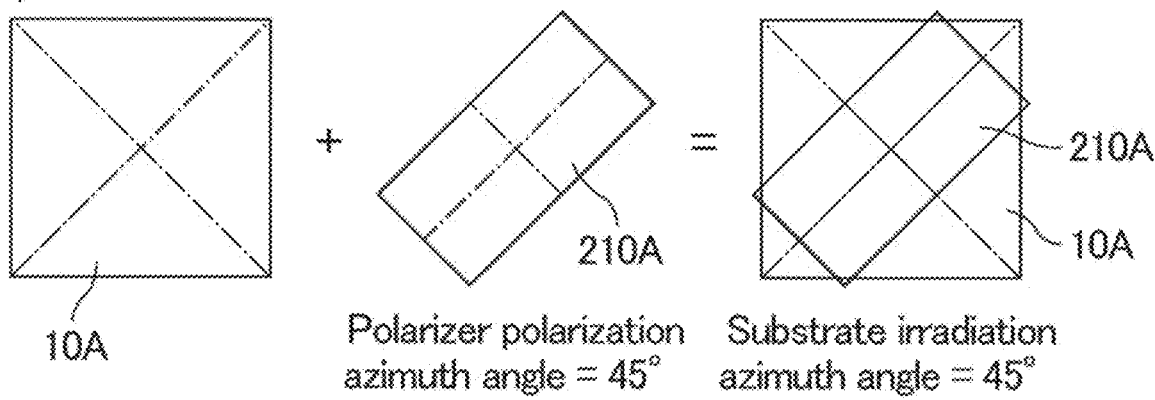
(b)
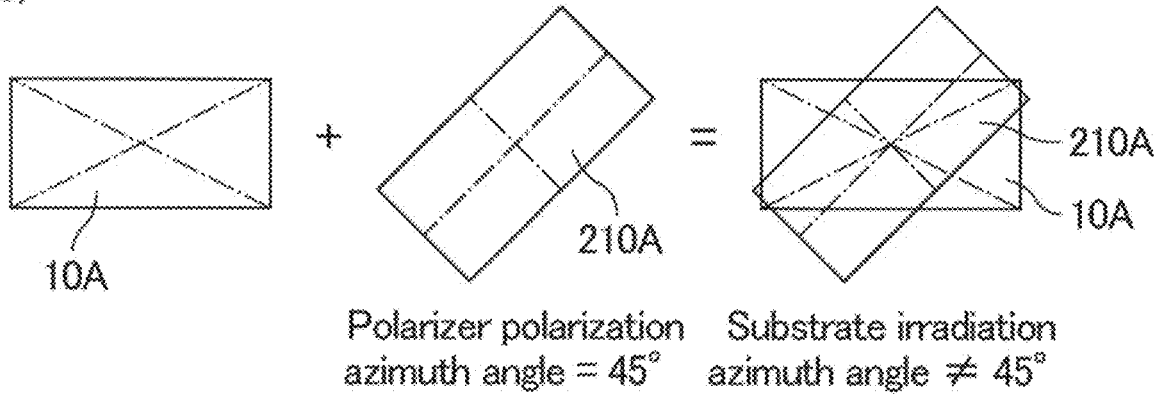

POLARIZED-LIGHT IRRADIATION DEVICE AND METHOD FOR MANUFACTURING LIQUID CRYSTAL DISPLAY DEVICE

TECHNICAL FIELD

The present invention relates to a polarized light irradiation device, and a method for manufacturing a liquid crystal display device. The present invention particularly relates to a polarized light irradiation device for forming a photo alignment film, and a method for manufacturing a liquid crystal display device by using the polarized light irradiation device.

BACKGROUND ART

A liquid crystal display device is a display device that uses a liquid crystal composition for display. In a typical display scheme thereof, a liquid crystal display panel in which a liquid crystal composition is encapsulated between a pair of substrates is irradiated with light from a backlight and voltage is applied to the liquid crystal composition to change the alignment of liquid crystal molecules, whereby the amount of light transmitted through the liquid crystal display panel is controlled. Such a liquid crystal display device has characteristics such as small thickness, lightweight, and low electric power consumption, and thus is used in electronic devices such as a television, a smartphone, a tablet PC, and a car navigation.

In a conventionally discussed alignment division technology, an improved viewing angle characteristic is obtained by dividing each pixel into multiple alignment regions (domains) and aligning liquid crystal molecules in orientations different between the alignment regions. The pixel alignment division method is, for example, a method of dividing a half pixel into four alignment regions of two rows and two columns. Patent Literature 1 discusses a 4 domain-reverse twisted nematic (4D-RTN) mode, and a 4 domain-electrically controlled birefringence (4D-ECB) mode.

Patent Literature 1 discloses a technology of improving the transmittance and gray scale viewing angle characteristic of a VA mode liquid crystal display device having a four-divided alignment structure by using a first electrode that includes a trunk part and multiple branch parts extending in parallel from the trunk part, the branch parts including four groups extending in four different directions, optional two of four orientations having a difference therebetween substantially equal to an integral multiple of 90° and being angled substantially at 45° relative to the polarization axes of two polarizing plates.

CITATION LIST

Patent Literature

Patent Literature 1: JP 2011-85738 A

SUMMARY OF INVENTION

Technical Problem

In an effective method of controlling the alignment azimuth of liquid crystal molecules in a liquid crystal display device, an alignment film is provided to a substrate and alignment treatment is performed to apply an alignment azimuth angle to the liquid crystal molecules in advance. Examples of the method of applying an alignment azimuth angle to the liquid crystal molecules include methods of a rubbing scheme and a light alignment scheme. In the method of the rubbing scheme, a roller around which fabric made of, for example, nylon is wound is rotated while being pressed at a constant pressure against the substrate coated with the alignment film, and thereby the surface of the alignment film is rubbed in a constant direction. When the alignment azimuth angle of 45° is applied to liquid crystal molecules by the method of the rubbing scheme, the angle between the substrate and the rubbing direction is set to be 45°.

In the method of the light alignment scheme, a photo alignment film made of a light alignment property material is irradiated with, for example, linearly polarized ultraviolet to selectively change the structure of the photo alignment film in the polarization direction, thereby causing the photo alignment film to develop anisotropy to apply an alignment azimuth angle to liquid crystal molecules.

FIG. 22 is a perspective pattern diagram illustrating the situation of polarized light irradiation by a polarized light irradiation device according to Comparative Example 1. In a polarized light irradiation device 200A according to Comparative Example 1, when the incident angle of ultraviolet light 230A on a substrate 10A provided with a photo alignment film (angle between the normal of the surface of the substrate 10A and the ultraviolet light) was set to be larger than 0° and the longitudinal direction of the substrate 10A was taken to be 0°, a polarization azimuth angle, which is an angle of a polarization axis 211A of a polarizer 210A when the polarization axis 211A of the polarizer 210A is projected onto the substrate 10A, was set to be 0° as viewed in the irradiation axis direction of the ultraviolet light 230A, and polarized light irradiation was performed while the substrate 10A was moved in a conveyance direction 240A illustrated in FIG. 22. When the photo alignment film is irradiated with polarized light by using the polarized light irradiation device 200A according to Comparative Example 1, the polarized light having passed through the polarizer 210A and a light-shielding mask 220A is incident on the substrate 10A while the polarization azimuth angle of the polarizer 210A is maintained at 0°. In other words, the polarization azimuth angle of the polarizer 210A is equal to the irradiation azimuth angle on the substrate 10A. The irradiation azimuth angle on the substrate is the angle of polarized light with which the substrate 10A is irradiated when the longitudinal direction of the substrate 10A is taken to be 0°.

The present inventors have further made investigations concerning a case in which the incident angle of ultraviolet light on the photo alignment film is larger than 0°. FIG. 23 is a perspective pattern diagram illustrating the situation of polarized light irradiation by a polarized light irradiation device according to Comparative Example 2. In the polarized light irradiation device 200A according to Comparative Example 2, by setting the incident angle of the ultraviolet light 230A on the substrate 10A provided with the photo alignment film to be larger than 0°, and the polarization azimuth angle of the polarizer 210A to be 45°, polarized light irradiation was performed. As a result, it has been found that even when the polarization azimuth angle of the polarizer 210A is set to be 45°, the irradiation azimuth angle on the substrate 10A is not 45°, and the alignment azimuth angle of 45° cannot be applied to liquid crystal molecules. The alignment azimuth angle of liquid crystal molecules is the angle of the long axis of liquid crystal molecules projected onto the substrate 10A when the longitudinal direction of the substrate 10A is taken to be 0°.

FIG. 24 is a diagram illustrating the relation among the incident angle of ultraviolet light, the polarization azimuth angle of the polarizer, and the irradiation azimuth angle on the substrate: (a) is a diagram of a case in which the incident angle is 0°; and (b) is a diagram of a case in which the incident angle is 40°. When the incident angle of ultraviolet light is 0°, the shape of the substrate 10A when viewed from the irradiation axis direction of ultraviolet light is a square as illustrated in FIG. 24 (a), and polarized light having passed through the polarizer 210A having a polarization azimuth angle α of 45° is incident on the substrate 10A at the azimuth angle of 45°. In other words, the irradiation azimuth angle on the substrate 10A is 45°.

When the incident angle of ultraviolet light is 40°, the shape of the substrate 10A when viewed from the irradiation axis direction of ultraviolet light is a rectangle as illustrated in FIG. 24 (b), and the polarization axis of polarized light having passed through the polarizer 210A having a polarization azimuth angle α of 45° shifts when the polarized light reaches the substrate 10A. Accordingly, the irradiation azimuth angle on the substrate 10A is not 45°. In other words, the polarization azimuth angle α of the polarizer 210A is not equal to the irradiation azimuth angle on the substrate 10A.

In addition, the present inventors made investigations concerning the relation between the irradiation azimuth angle on the substrate and the alignment azimuth angle of liquid crystal molecules, and have found that the alignment azimuth angle of liquid crystal molecules is not 45° even when the irradiation azimuth angle on the substrate is set to be 45°. Specifically, in the light alignment scheme, when the incident angle of ultraviolet light is larger than 0°, the irradiation azimuth angle on the substrate does not become 45° even if the polarization azimuth angle of the polarizer is set to be 45°, and the alignment azimuth angle of liquid crystal molecules does not become 45° even if the irradiation azimuth angle on the substrate is adjusted to be 45°.

As described above, when the incident angle of ultraviolet light is larger than 0°, a difference occurs between the polarization azimuth angle of the polarizer and the alignment azimuth angle of liquid crystal molecules, and thus it is difficult to set the alignment azimuth angle of liquid crystal molecules to be a desired angle. Thus, a polarized light irradiation method capable of setting the alignment azimuth angle of liquid crystal molecules to be a desired angle has been requested.

Patent Literature 1 discloses, in FIG. 5, a liquid crystal display device having an alignment azimuth in the four domains of 225°, 315°, 45°, and 135°, and discloses, for example, in FIG. 6, a situation in which a substrate is irradiated with polarized light. However, Patent Literature 1 does not describe in detail, for example, how to set the polarization azimuth angle of a polarizer in irradiating polarized light.

The present invention has been made in view of such a current state of the art and aims to provide a polarized light irradiation device capable of setting the alignment azimuth angle of liquid crystal molecules to be a desired angle in the range of 45°±15° or −45°±15° when the incident angle of polarized light is larger than 0°, and a method for manufacturing a liquid crystal display device by using the polarized light irradiation device.

Solution to Problem

The present inventors made various investigations concerning a method of setting the alignment azimuth angle of liquid crystal molecules to be a desired angle in the range of 45°±15° or −45°±15° when the incident angle of polarized light is larger than 0° in alignment treatment using the light alignment scheme. Then, the present inventors have found that the alignment azimuth angle of liquid crystal molecules can be controlled to a desired range by considering the difference between the polarization azimuth angle of a polarizer and the alignment azimuth angle of liquid crystal molecules. Thereby, the inventors have arrived at the solution to the above problem, completing the present invention.

Specifically, one aspect of the present invention may be a polarized light irradiation device used in alignment treatment of a photo alignment film provided on a substrate. The device includes: a stage including a placement surface on which the substrate is placed; and a polarized light irradiation unit configured to irradiate the placement surface with polarized light through a polarizer in a direction tilted relative to the normal of the placement surface. A polarization azimuth angle α, which is an angle of the polarization axis of the polarizer when the polarization axis of the polarizer is projected onto the placement surface, satisfies $30°<α<45°$, $45°<α<60°$, $-60°<α<-45°$, or $-45°<α<-30°$, as viewed in an irradiation axis direction of the polarized light with the longitudinal direction of the substrate taken to be 0°.

The angle of the tilted direction may be 30° or greater and 60° or smaller relative to the normal of the placement surface.

The polarizer may have an extinction ratio of 50:1 to 500:1.

The polarized light with which the placement surface is irradiated may have an accumulated exposure amount of 10 mJ/cm$^2$ or more and 100 mJ/cm$^2$ or less.

The stage may include a conveyance mechanism configured to convey the substrate.

Another aspect of the present invention may be a method for manufacturing a liquid crystal display device. The method includes a photo alignment film formation process of providing a photo alignment film on the surface of at least one of a first substrate and a second substrate; and at least one polarized light irradiation process of irradiating the photo alignment film with polarized light. The polarized light irradiation process irradiates the photo alignment film with polarized light through a polarizer in a direction tilted relative to the normal of the surface. A polarization azimuth angle α, which is an angle of the polarization axis of the polarizer when the polarization axis of the polarizer is projected onto the substrate, satisfies $30°<α<45°$, $45°<α<60°$, $-60°<α<-45°$, or $-45°<α<-30°$, as viewed in an irradiation axis direction of the polarized light with the longitudinal direction of the substrate taken to be 0°.

The polarized light irradiation process may irradiate the photo alignment film with polarized light while conveying the substrate.

The method for manufacturing a liquid crystal display device may include the multiple polarized light irradiation processes. At least one of the polarization azimuth angle α and the conveyance direction of the substrate may be different between at least two of the polarized light irradiation processes.

The polarization azimuth angle α may be different between at least two of the polarized light irradiation processes.

The conveyance direction of the substrate may be different between at least two of the polarized light irradiation processes.

Advantageous Effects of Invention

The present invention can provide a polarized light irradiation device capable of setting an alignment azimuth angle θ of liquid crystal molecules to be a desired angle even when the incident angle of polarized light on a substrate is not 0° in irradiation of a photo alignment film with polarized light, and a method for manufacturing a liquid crystal display device by using the polarized light irradiation device.

BRIEF DESCRIPTION OF DRAWINGS

FIG. 6 is a diagram for description of vector synthesis of the polarization axis.

FIG. 9 is a pattern diagram illustrating a method for manufacturing a liquid crystal display device according to Embodiment 2: (a) is a side pattern diagram illustrating a situation in which the photo alignment film is provided on the substrate in a photo alignment film formation process; and (b) is a perspective pattern diagram illustrating a polarized light irradiation process of irradiating the photo alignment film with polarized light.

FIG. 24 is a diagram illustrating the relation among the incident angle of ultraviolet light, the polarization azimuth angle of the polarizer, and the irradiation azimuth angle on the substrate: (a) is a diagram of a case in which the incident angle is 0°; and (b) is a diagram of a case in which the incident angle is 40°.

DESCRIPTION OF EMBODIMENTS

Embodiments of the present invention will be described below. The present invention is not limited to the contents described in the following embodiments, and it is possible to appropriately change the design within the scope of satisfying the constitution of the present invention.

Embodiment 1

Figure 1:
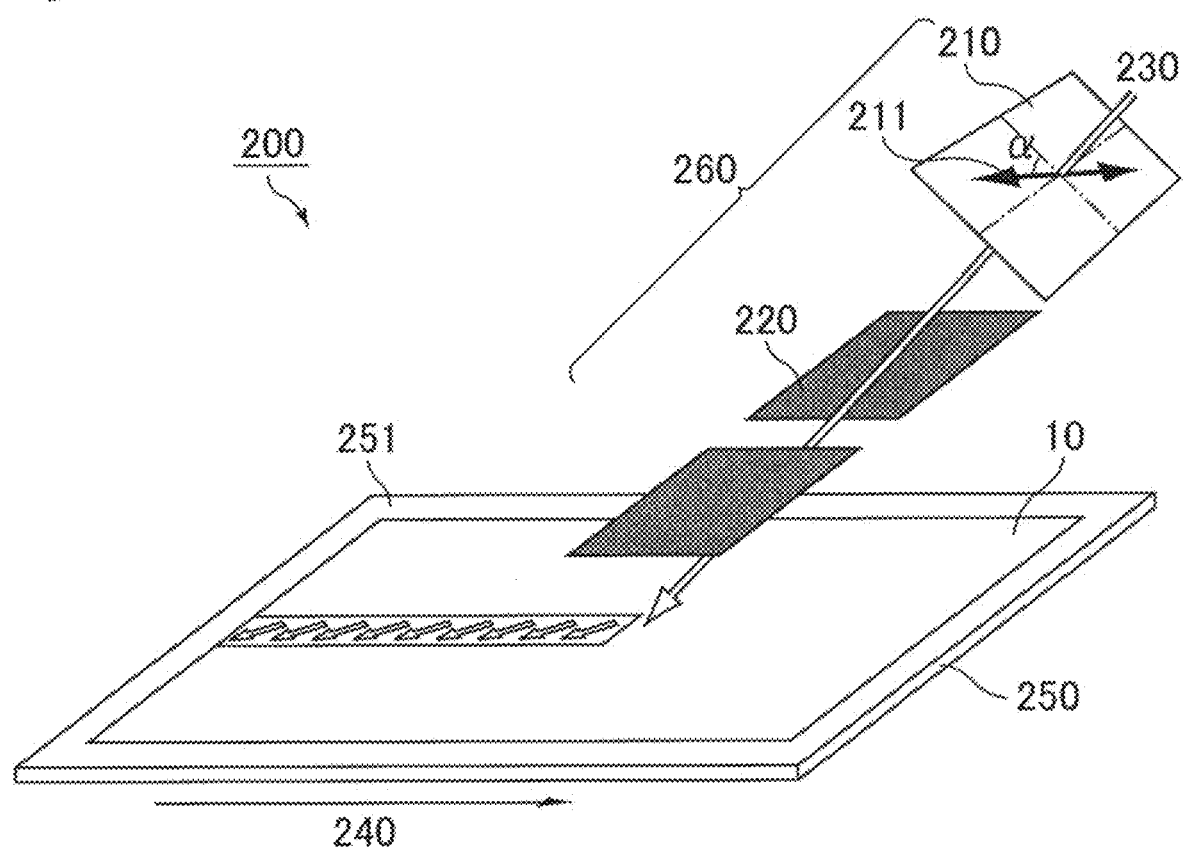
FIG. 1 is a perspective pattern diagram illustrating the situation of polarized light irradiation by a polarized light irradiation device according to Embodiment 1.
Figure 2:
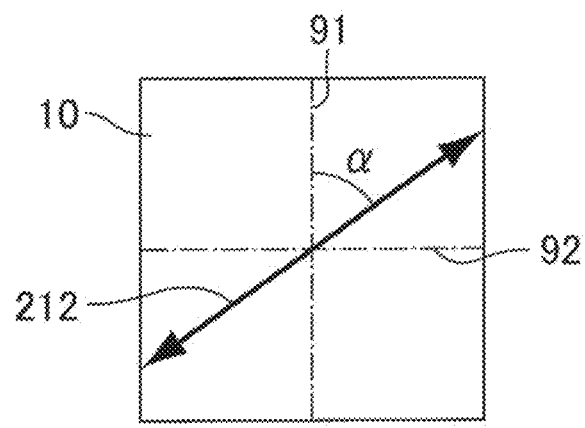
FIG. 2 is a diagram for description of the polarization azimuth angle of a polarizer when viewed from an ultraviolet light incident side.
Figure 3:
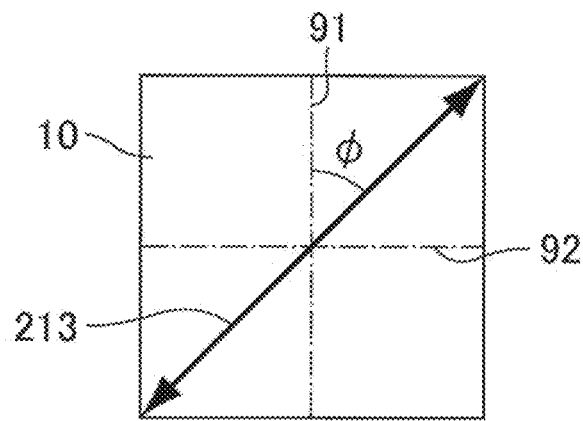
FIG. 3 is a diagram for description of the irradiation azimuth angle of polarized light on a substrate.
Figure 4:
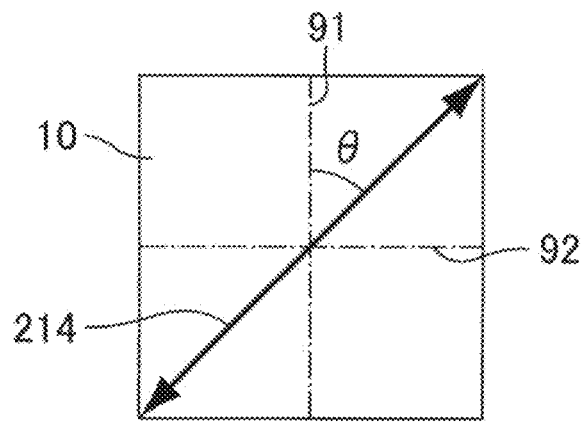
FIG. 4 is a diagram for description of the alignment azimuth angle of liquid crystal molecules.

FIG. 1 is a perspective pattern diagram illustrating the situation of polarized light irradiation by a polarized light irradiation device according to Embodiment 1. FIG. 2 is a diagram for description of the polarization azimuth angle of a polarizer when viewed from an ultraviolet light incident side. FIG. 3 is a diagram for description of the irradiation azimuth angle of polarized light on a substrate. FIG. 4 is a diagram for description of the alignment azimuth angle of liquid crystal molecules.

As illustrated in FIG. 1, a polarized light irradiation device 200 according to Embodiment 1 is used for alignment treatment of a photo alignment film provided on a substrate 10. The polarized light irradiation device 200 includes a stage 250 including a placement surface 251 on which the substrate 10 is placed, and a polarized light irradiation unit 260 configured to irradiate the placement surface 251 with polarized light through a polarizer 210 in a direction tilted relative to the normal of the placement surface 251. A polarization azimuth angle α as the angle of a polarization axis 211 of the polarizer 210 when the polarization axis 211 of the polarizer 210 is projected onto the placement surface 251 satisfies 30°<α<45°, 45°<α<60°, −60°<α<−45°, or −45°<α<−30°, when viewed in the irradiation axis direction of the polarized light with the longitudinal direction of the substrate 10 taken to be 0°. The irradiation axis is a direction in which ultraviolet light 230 emitted to the stage 250 travels straight.

The stage 250 includes the placement surface 251 on which the substrate 10 provided with the photo alignment film is placed. The stage 250 includes a plane part having an area equivalent to or larger than that of the substrate 10. The stage 250 may be provided with a conveyance mechanism to convey the substrate 10. The conveyance mechanism has, for example, a structure in which the stage 250 moves on a rail. When the stage 250 includes the conveyance mechanism, the surface of the photo alignment film can be irradiated with polarized light while the substrate 10 provided with the photo alignment film is conveyed, for example, in a conveyance direction 240.

The polarized light irradiation unit 260 includes a light source configured to generate the ultraviolet light 230, the polarizer 210 configured to take polarized light out of the ultraviolet light 230, and a light-shielding mask 220. The light source configured to generate the ultraviolet light 230 is, for example, a UV lamp. Examples of the polarizer 210 include a polarizing plate in which a polyvinyl alcohol (PVA) film on which an anisotropic material such as a dichroic iodine complex is adsorbed and aligned, a wire grid polarizer (WGP) provided with a minute metal lattice, and a polarizing beam splitter (PBS) through which random polarized light is divided into reflected light of s polarized light and transmitted light of p polarized light. The light-shielding mask 220 provides light-shielding to part of the ultraviolet light 230 and is used to perform polarized light irradiation in a desired range.

The present inventors have performed various investigations concerning influence of the condition of polarized light irradiation on an alignment azimuth angle θ of liquid crystal molecules, and have found that the following four parameters are important. Specifically, the four parameters are (1) the incident angle of ultraviolet light, (2) the extinction ratio of the polarizer, (3) the type of the photo alignment film, and (4) the accumulated exposure amount on the photo alignment film.

Table 1 below indicates the relation among the polarization azimuth angle α of the polarizer 210, a substrate irradiation azimuth angle φ, and the alignment azimuth angle θ of liquid crystal molecules. Table 1 below lists a result of irradiation of a 4D-RTN mode photo alignment film with polarized light when the incident angle of ultraviolet light is 40° and the extinction ratio of the polarizer is 80:1.

The polarization azimuth angle α of the polarizer, the substrate irradiation azimuth angle φ, and the alignment azimuth angle θ of liquid crystal molecules in Table 1 below are angles illustrated in FIGS. 2 to 4, respectively.

FIG. 2 is a diagram for description of the polarization azimuth angle of a polarizer when viewed from an ultraviolet light incident side. As illustrated in FIG. 2, the polarization azimuth angle α of the polarizer is the angle of a polarization axis 212 of the polarizer projected onto the substrate 10 when a longitudinal direction 91 of the substrate 10 is taken to be 0°. FIG. 2 also illustrates a transverse direction 92 of the substrate in addition to the longitudinal direction 91 of the substrate.

FIG. 3 is a diagram for description of the irradiation azimuth angle of polarized light on a substrate. As illustrated in FIG. 3, the substrate irradiation azimuth angle φ is the angle of an irradiation orientation 213 of polarized light on the substrate 10 when the longitudinal direction 91 of the substrate 10 is taken to be 0°. FIG. 3 also illustrates the transverse direction 92 of the substrate in addition to the longitudinal direction 91 of the substrate.

FIG. 4 is a diagram for description of the alignment azimuth angle of liquid crystal molecules. As illustrated in FIG. 4, the alignment azimuth angle θ of liquid crystal molecules is the angle of an alignment azimuth 214 of liquid crystal molecules projected onto the substrate 10 when the longitudinal direction 91 of the substrate 10 is taken to be 0°. The alignment azimuth 214 of liquid crystal molecules is the direction of the long axis of each liquid crystal molecule. FIG. 4 also illustrates the transverse direction 92 of the substrate in addition to the longitudinal direction 91 of the substrate.

TABLE 1

| | Polarizer polarization azimuth angle α | Substrate irradiation azimuth angle φ | Liquid crystal molecule alignment azimuth angle θ |
|---|---|---|---|
| Example 1 | 52.6° | 45.0° | ≈47° |
| Example 2 | 51.0° | 43.4° | ≈45° |

As indicated in Example 1, when the polarization azimuth angle α of the polarizer 210 is rotated by 52.6°, the irradiation azimuth angle φ on the substrate 10 is 45°, but the alignment azimuth angle θ of liquid crystal molecules is 47°, which is not equal to the irradiation azimuth angle φ on the substrate 10. As indicated in Example 2, when the polarization azimuth angle α of the polarizer 210 is 51.0°, the irradiation azimuth angle φ on the substrate 10 is 43.4°, but the alignment azimuth angle θ of liquid crystal molecules can be set to be 45°.

The present inventors have found the following reasons (1) to (4) why the polarization azimuth angle α of the polarizer is not equal to the substrate irradiation azimuth angle φ, and the substrate irradiation azimuth angle φ is not equal to the alignment azimuth angle θ of liquid crystal molecules, when the incident angle of polarized light is larger than 0° as described above:

(1) The polarization axis shifts when the substrate is irradiated with polarized light because the incident angle of polarized light is not 0°; (2) the alignment azimuth angle of liquid crystal molecules shifts due to the exposure amount of the photo alignment film; (3) the alignment azimuth angle of liquid crystal molecules shifts due to the extinction ratio of the polarizer; and (4) the alignment azimuth angle of liquid crystal molecules shifts due to the kind of the photo alignment film.

In addition, the present inventors have found that the irradiation azimuth angle φ on the substrate 10 is related to the incident angle of ultraviolet light and the polarization azimuth angle α of the polarizer 210, and the alignment azimuth angle θ of liquid crystal molecules is related to the extinction ratio of the polarizer, the kind of the photo alignment film, and the accumulated exposure amount on the photo alignment film in addition to the irradiation azimuth angle φ on the substrate 10.

Figure 5:
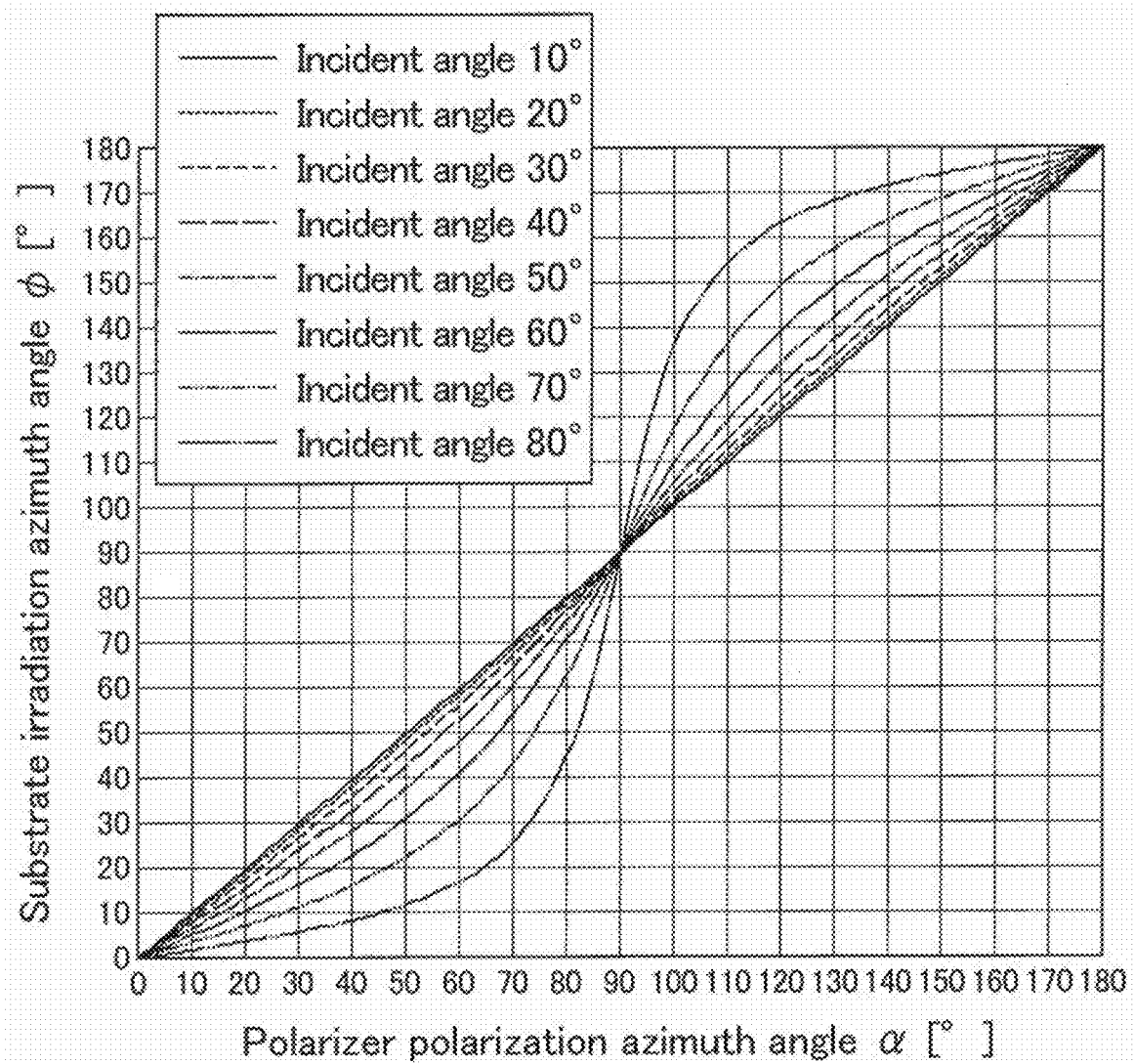
FIG. 5 is a graph indicating the relation between the polarization azimuth angle of the polarizer and the irradiation azimuth angle on the substrate.

FIG. 5 is a graph illustrating the relation between the polarization azimuth angle of the polarizer and the irradiation azimuth angle on the substrate. When the incident angle of polarized light is larger than 0°, the polarization azimuth angle α of the polarizer is not equal to the substrate irradiation azimuth angle φ. Specifically, the relation of Equation 1 below holds through geometric calculation, and the polarization azimuth angle α of the polarizer and the substrate irradiation azimuth angle φ have the relation indicated by the graph in FIG. 5. In Equation 1 below, α represents the polarization azimuth angle of the polarizer, β represents the incident angle of polarized light, and φ represents the irradiation azimuth angle on the substrate.

$$\alpha = 90° - \arctan\{1/(\cos\beta \cdot \tan\phi)\} \quad \text{(Equation 1)}$$

The substrate irradiation azimuth angle φ can be obtained from Equation 1 above, but the substrate irradiation azimuth angle φ is not equal to the alignment azimuth angle θ of liquid crystal molecules. The reasons why the substrate irradiation azimuth angle φ is not equal to the alignment azimuth angle θ of liquid crystal molecules are as follows.

The first reason is that every polarizer has an extinction ratio, and the polarization axis having a long-axis component always has a short-axis component. FIG. 6 is a diagram for description of vector synthesis of the polarization axis. FIG. 6 illustrates a result of irradiation of a 4D-RTN mode photo alignment film with polarized light when the incident angle of ultraviolet light is 40° and the extinction ratio of the polarizer is 80:1.

As indicated in Example 1 in FIG. 6, when the polarization azimuth angle α of the polarizer is 52.60, a substrate irradiation azimuth angle φ1 corresponding to a polarization axis α1 of the long-axis φ1 component is 45.0°, a substrate irradiation azimuth angle φ2 corresponding to a polarization axis α2 of the short-axis component is 30.4°, and a substrate irradiation azimuth angle φv after synthesis of the vectors of the irradiation azimuth angles φ1 and φ2 is 44.3°. As indicated in Example 2 in FIG. 6, when the polarization azimuth angle α of the polarizer is 51.0°, the substrate irradiation azimuth angle φ1 corresponding to the polarization axis α1 of the long-axis component is 43.4°, the substrate irradiation azimuth angle φ2 corresponding to the polarization axis α2 of the short-axis component is 31.8°, and the substrate irradiation azimuth angle φv after synthesis of the vectors of the irradiation azimuth angles φ1 and φ2 is 42.7°. As described above, every polarizer always has an extinction ratio, and thus the substrate irradiation azimuth angle needs to be considered based on synthesis of the vectors of φ1 and φ2. Accordingly, the alignment azimuth angle θ of liquid crystal molecules is affected by the extinction ratio of the polarizer.

Figure 7:
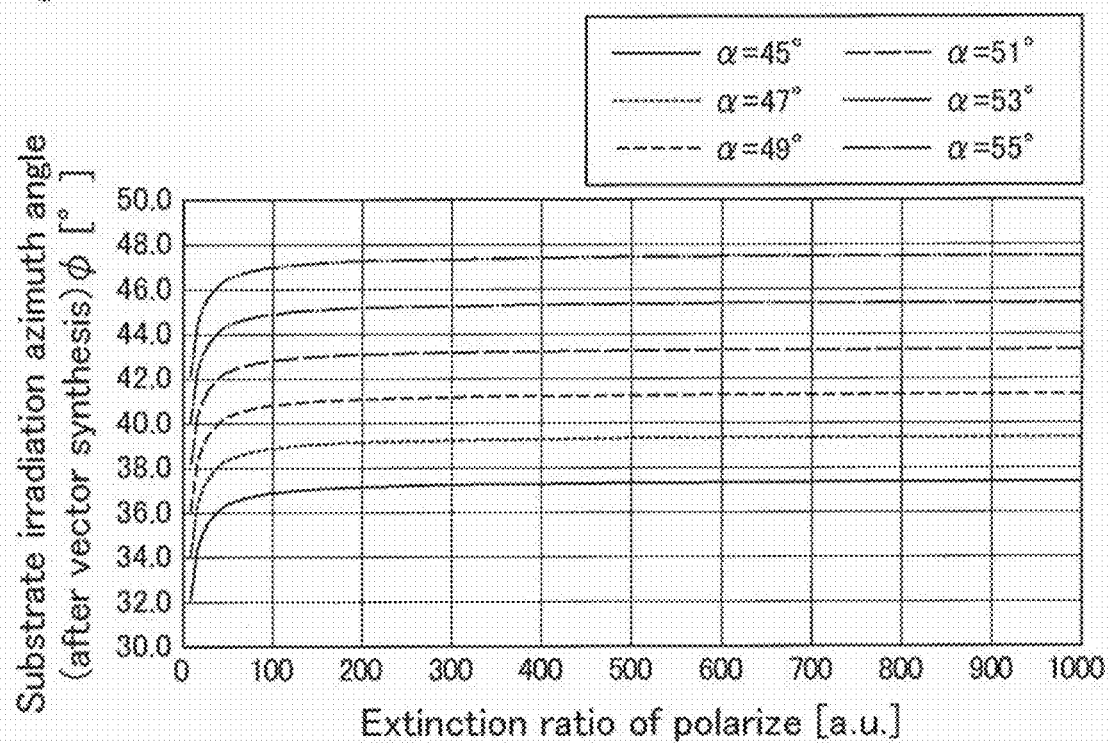
FIG. 7 is a graph indicating the relation between the extinction ratio of the polarizer and the irradiation azimuth angle on the substrate for each incident angle.

FIG. 7 is a graph indicating the relation between the extinction ratio of the polarizer and the substrate irradiation azimuth angle for each incident angle. The substrate irradiation azimuth angle φ is an irradiation azimuth angle after vector synthesis. As illustrated in FIG. 7, the substrate irradiation azimuth angle φ varies according to the extinction ratio of the polarizer even for the same ultraviolet light incident angle α.

Figure 8:
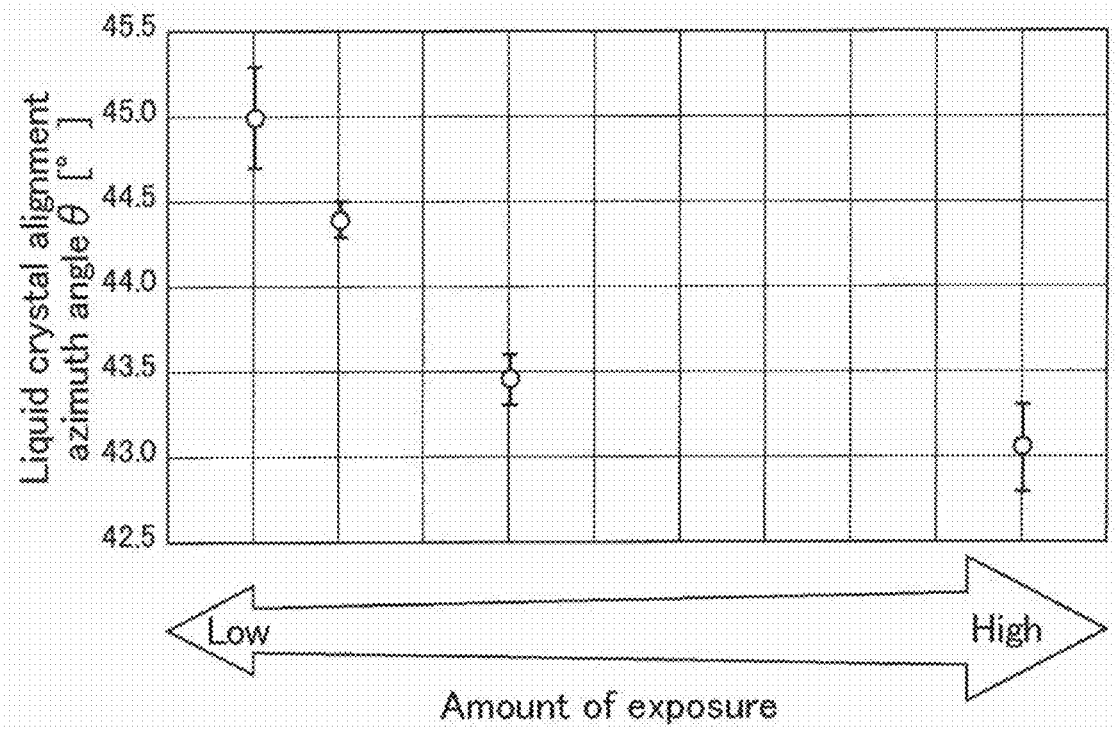
FIG. 8 is a graph illustrating the relation between the amount of exposure on a photo alignment film and the alignment azimuth angle of liquid crystal molecules.

The second reason why the substrate irradiation azimuth angle φ is not equal to the alignment azimuth angle θ of liquid crystal molecules is because the alignment azimuth angle θ of liquid crystal molecules changes with the amount of exposure on the photo alignment film. FIG. 8 is a graph illustrating the relation between the amount of exposure on the photo alignment film and the alignment azimuth angle of liquid crystal molecules. As illustrated in FIG. 8, the alignment azimuth angle θ of liquid crystal molecules decreases as the amount of exposure on the photo alignment film increases.

The amount of change of the alignment azimuth angle θ of liquid crystal molecules relative to the amount of exposure on the photo alignment film is different depending on the kind of the photo alignment film. This is the third reason why the substrate irradiation azimuth angle φ is not equal to the alignment azimuth angle θ of liquid crystal molecules.

It is considered that substrate irradiation azimuth angle φ is not equal to the alignment azimuth angle θ of liquid crystal molecules because of the above-described reasons.

The present inventors have found, through discussions as described above, preferable ranges of various parameters for setting the alignment azimuth angle θ of liquid crystal molecules to be ±45°.

The polarized light irradiation on the substrate 10 is performed in a direction tilted relative to the normal of the placement surface 251, and preferably performed in a direction tilted by an angle of 30° or greater and 60° or smaller relative to the normal of the placement surface 251.

The extinction ratio of the polarizer 210 is preferably 50:1 to 500:1, and more preferably 100:1 to 500:1. The extinction ratio is expressed as a property unique to the polarizer, and defined by Equation 2 below.

Extinction ratio=(Polarized light transmittance in polarizer transmission axis direction)/(Polarized light transmittance of polarizer absorption axis direction)) (Equation 2)

The "polarized light transmittance" herein is a transmittance at incidence of ideal polarized light by using a Glan-laser prism. The extinction ratio of the Glan-laser prism is preferably $5\times10^{-5}$ or higher.

The accumulated exposure amount of polarized light with which the surface of the substrate 10 is irradiated is preferably 10 mJ/cm$^2$ or more and 100 mJ/cm$^2$ or less. The accumulated exposure amount is the time integral value of the exposure amount of irradiation light per unit area, and can be obtained by multiplying an illuminance measured by a spectroradiometer by the time of light irradiation.

Embodiment 2

FIG. 9 is a pattern diagram illustrating a method for manufacturing a liquid crystal display device according to Embodiment 2: (a) is a side pattern diagram illustrating a situation in which the photo alignment film is provided on the substrate in a photo alignment film formation process; and (b) is a perspective pattern diagram illustrating a polarized light irradiation process of irradiating the photo alignment film with polarized light. The polarized light irradiation device according to Embodiment 1 can be used in the method for manufacturing a liquid crystal display device according to Embodiment 2, and thus any duplicate description will be omitted as appropriate.

The method for manufacturing a liquid crystal display device according to the present embodiment includes the photo alignment film formation process of providing a photo alignment film 70 on the surface of at least one of a first substrate 10B and a second substrate 50B, and the polarized light irradiation process is a process of irradiating the photo alignment film 70 with polarized light. The polarized light irradiation process irradiates the photo alignment film 70 with polarized light through the polarizer 210 in a direction tilted relative to the normal of the surface. The polarization azimuth angle α as the angle of the polarization axis 211 of the polarizer 210 when the polarization axis 211 of the polarizer 210 is projected onto the substrate, satisfies 30°<α<45°, 45°<α<60°, −60°<α<−45°, or −45°<α<−30°, when viewed in the irradiation axis direction of polarized light with the longitudinal direction of the substrate (at least one of the first substrate 10B and the second substrate 50B) taken to be 0°.

The photo alignment film formation process will be first described. In the photo alignment film formation process of the method for manufacturing a liquid crystal display device according to the present embodiment, the photo alignment film 70 is provided on the surface of at least one of the first substrate 10B and the second substrate 50B as illustrated in FIG. 9(a).

The following describes a specific example of the photo alignment film formation process.

First, a rubbing agent is prepared by dissolving a light alignment property material into, for example, a solvent such as an organic solvent. The rubbing agent may contain any other optional component as necessary, and is preferably prepared as a composition in a form of solution in which each component is dissolved in a solvent. The organic solvent is preferably a solvent that dissolves the light alignment property material and any other optional component but does not react with these components. Examples of the other optional component include a hardening agent, a hardening accelerator, and a catalyst. The light alignment property material is preferably a material containing an azobenzene group, a chalcone group, or a cinnamate group.

Subsequently, the rubbing agent is applied on the surface of at least one of the first substrate 10B and the second substrate 50B. In other words, the rubbing agent is applied on the surface of the first substrate 10B and/or the surface of the second substrate 50B. The application method is not particularly limited, and may be, for example, a roll coater method, a spinner method, a printing method, or an ink jet method.

After the rubbing agent is applied on the surface of the first substrate 10B and/or the surface of the second substrate 50B, the first substrate 10B and/or the second substrate 50B on which the rubbing agent is applied is heated. Accordingly, the solvent in the rubbing agent vaporizes to form the photo alignment film 70. The heating may be performed at two stages of temporal baking (pre-baking) and final baking (post-baking).

The photo alignment film 70 may be formed only on any one of the first substrate 10B and the second substrate 50B. Divided alignment treatment may be performed for multi-domain.

Next, the following describes the polarized light irradiation process of irradiating the photo alignment film 70 with polarized light. As illustrated in FIG. 9(b), the polarized light irradiation process irradiates the photo alignment film 70 with polarized light through the polarizer 210 in a direction tilted relative to the normal of the surface of the first substrate 10B and/or the surface of the second substrate 50B, on which the photo alignment film 70 is provided. The polarization azimuth angle α as the angle of the polarization axis 211 of the polarizer 210 when the polarization axis 211 of the polarizer 210 is projected onto the substrate (the first substrate 10B and/or the second substrate 50B provided with the photo alignment film 70) satisfies 30°<α<45° or 45°<α<60°, when viewed in an irradiation axis direction of the polarized light with the longitudinal direction of the first substrate 10B and/or the second substrate 50B provided with the photo alignment film 70 taken to be 0°.

The polarized light irradiation process may irradiate the photo alignment film 70 with polarized light while conveying the first substrate 10B and/or the second substrate 50B. The first substrate 10B and/or the second substrate 50B is conveyed by, for example, a method of placing the first substrate 10B and/or the second substrate 50B on the stage 250 and moving the stage 250 to convey the first substrate 10B and/or the second substrate 50B to the conveyance direction 240.

In the polarized light irradiation process, the photo alignment film 70 is irradiated with polarized light and provided with desired alignment restraining force. Specifically, the photo alignment film 70 is irradiated with (exposed to) light such as ultraviolet light. As a result, structural change occurs in the light alignment property material, and the molecule structure and/or alignment of at least part of the light alignment property material changes. Accordingly, the photo alignment film 70 can control the alignment of liquid crystal molecules in contact with the surface thereof.

The polarized light irradiation process may be performed by using, for example, a device that includes a light source configured to irradiate the photo alignment film 70 with light and has a function of continuously performing scanning exposure over multiple pixels. Examples of specific aspects of the scanning exposure include the aspect of irradiating the surface of the substrate with a light beam emitted from the light source while moving the substrate, the aspect of irradiating the surface of the substrate with a light beam emitted from the light source while moving the light source, and the aspect of irradiating the surface of the substrate with a light beam emitted from the light source while moving the light source and the substrate.

The method for manufacturing a liquid crystal display device according to Embodiment 2 may include multiple polarized light irradiation processes, and at least one of the polarization azimuth angle α and the substrate conveyance direction 240 may be different between at least two of the polarized light irradiation processes. With this configuration, it is possible to more easily produce a liquid crystal display device having a divided alignment structure.

The polarization azimuth angle α and the substrate conveyance direction 240 may be different between at least two of the polarized light irradiation processes. With this configuration, it is possible to more easily produce a liquid crystal display device having a divided alignment structure.

Embodiment 3

A liquid crystal display device according to Embodiment 3 is, for example, a 4D-ECB alignment liquid crystal display device. The following describes the 4D-ECB alignment liquid crystal display device. The liquid crystal display device according to Embodiment 3 can be produced by the method for manufacturing a liquid crystal display device according to Embodiment 2, and thus any duplicate description will be omitted as appropriate.

Figure 10:
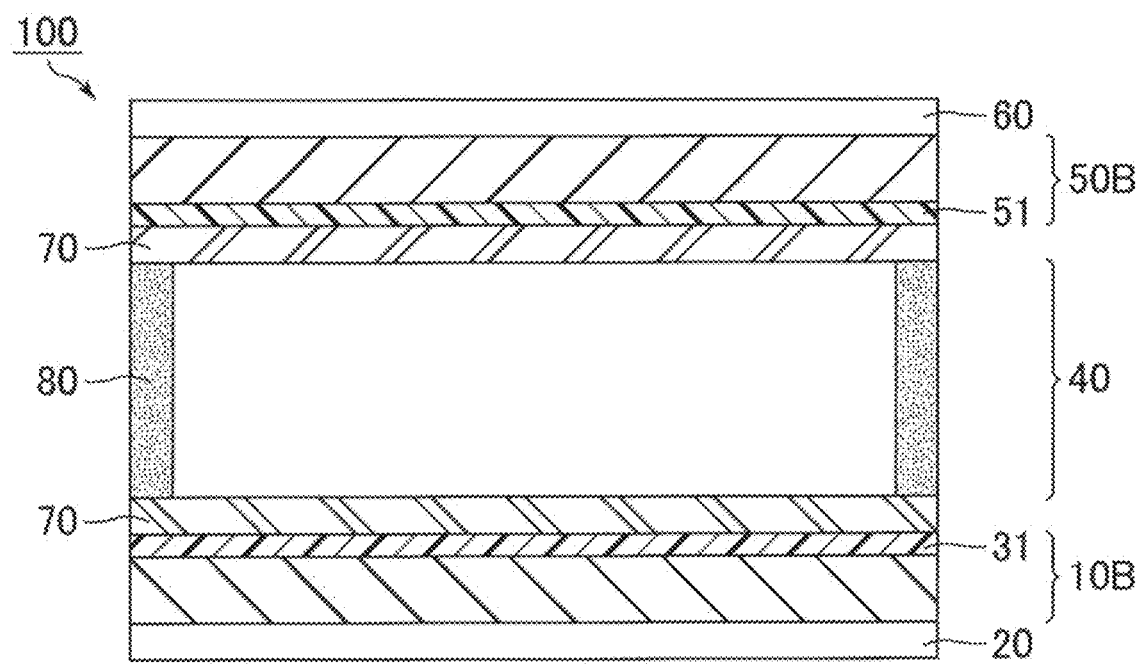
FIG. 10 is a schematic cross-sectional view schematically illustrating an exemplary 4D-ECB alignment liquid crystal display device.
Figure 11:
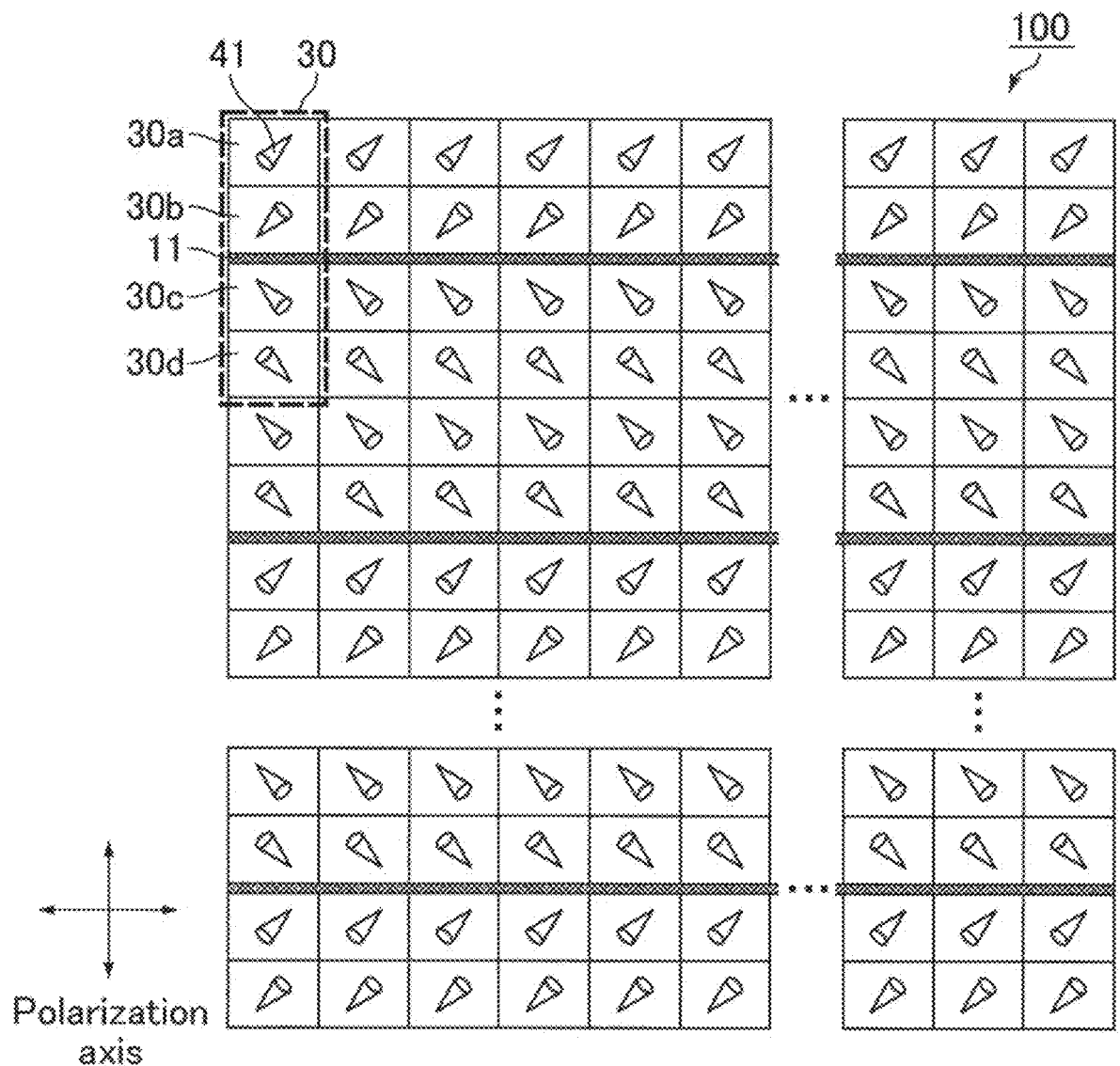
FIG. 11 is a schematic plan view schematically illustrating an exemplary 4D-ECB alignment liquid crystal display device.

FIG. 10 is a schematic cross-sectional view schematically illustrating an exemplary 4D-ECB alignment liquid crystal display device. FIG. 11 is a schematic plan view schematically illustrating the exemplary 4D-ECB alignment liquid crystal display device. As illustrated in FIG. 10, a liquid crystal display device 100 according to the present embodiment includes a first substrate 10B including a pixel electrode 31, a liquid crystal layer 40 containing liquid crystal molecules, and a second substrate 50B including a counter electrode 51 in the stated order. The liquid crystal layer 40 contains liquid crystal molecules, and a sealing material 80 is provided around the liquid crystal layer 40. As illustrated in FIG. 11, the liquid crystal display device 100 according to the present embodiment includes multiple pixels 30 arrayed in a matrix.

Figure 12:
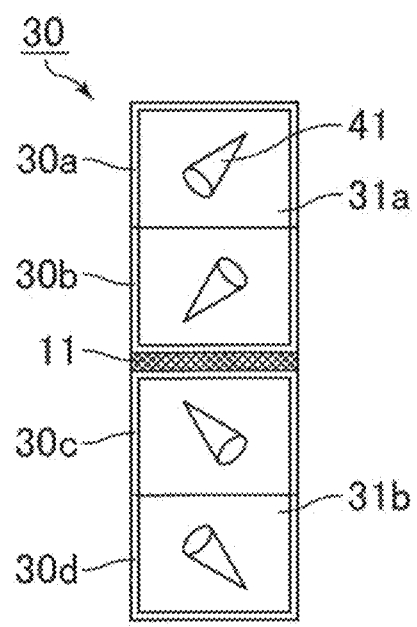
FIG. 12 is a schematic plan view illustrating one exemplary pixel.

FIG. 12 is a schematic plan view illustrating one exemplary pixel. As illustrated in FIGS. 11 and 12, each pixel included in the liquid crystal display device 100 according to the present embodiment includes at least four alignment regions of a first alignment region 30a, a second alignment region 30b, a third alignment region 30c, and a fourth alignment region 30d. The tilt orientation of liquid crystal molecules 41 differs between the four alignment regions and the first alignment region 30a, the second alignment region 30b, the third alignment region 30c, and the fourth alignment region 30d are disposed in this order in the longitudinal direction of the pixel. With such disposition, for example, the number of alignment regions included in each pixel can be reduced as compared to a conventional 4D-RTN mode liquid crystal display device in which each pixel is divided in alignment into a matrix of two columns and four rows, and thus the number of regions between which the alignment of the liquid crystal molecules 41 is discontinuous can be reduced, which leads to high transmittance.

The first substrate 10B includes the pixel electrode 31, and may be, for example, an active matrix substrate (TFT substrate). The TFT substrate may be a TFT substrate that is typically used in the field of liquid crystal display devices. As illustrated in FIG. 12, the pixel electrode 31 includes a first pixel electrode 31a through which voltage is applied to the first alignment region 30a and the second alignment region 30b, and a second pixel electrode 31b through which voltage is applied to the third alignment region 30c and the fourth alignment region 30d. Different voltages can be applied to the liquid crystal layer 40 through the first pixel electrode 31a and the second pixel electrode 31b, respectively.

The first substrate 10B may further include a gate signal line (signal line 11), and may be disposed across the pixels 30 in the transverse direction. The configuration of the TFT substrate in a plan view is, for example, a configuration including: multiple parallel gate signal lines on a transparent substrate; multiple source signal lines extending in a direction orthogonal to the gate signal lines and formed in parallel to each other; active elements such as TFTs disposed at intersection points between the gate signal lines and the source signal lines; and pixel electrodes and the like disposed in a matrix in regions partitioned by the gate signal lines and the source signal lines. The TFT is preferably a TFT in which a channel is formed of an oxide semiconductor.

The oxide semiconductor may be, for example, a compound (In—Ga—Zn—O) of indium (In), gallium (Ga), zinc (Zn), and oxygen (O), a compound (In-Tin-Zn—O) of indium (In), tin (Tin), zinc (Zn), and oxygen (O), or a compound (In—Al—Zn—O) of indium (In), aluminum (Al), zinc (Zn), and oxygen (O).

Alignment stabilized regions may be provided between the first alignment region 30a and the second alignment region 30b and between the third alignment region 30c and the fourth alignment region 30d. The alignment stabilized region between the first alignment region 30a and the second alignment region 30b is a dark line region generated between the first alignment region 30a and the second alignment region 30b, and the alignment stabilized region between the third alignment region 30c and the fourth alignment region 30d is a dark line region generated between the third alignment region 30c and the fourth alignment region 30d. In each alignment stabilized region, the liquid crystal molecules 41 are aligned in an energetically stable state, which stabilizes the alignment of the liquid crystal molecules 41 in the two alignment regions sandwiching the alignment stabilized region.

Figure 13:
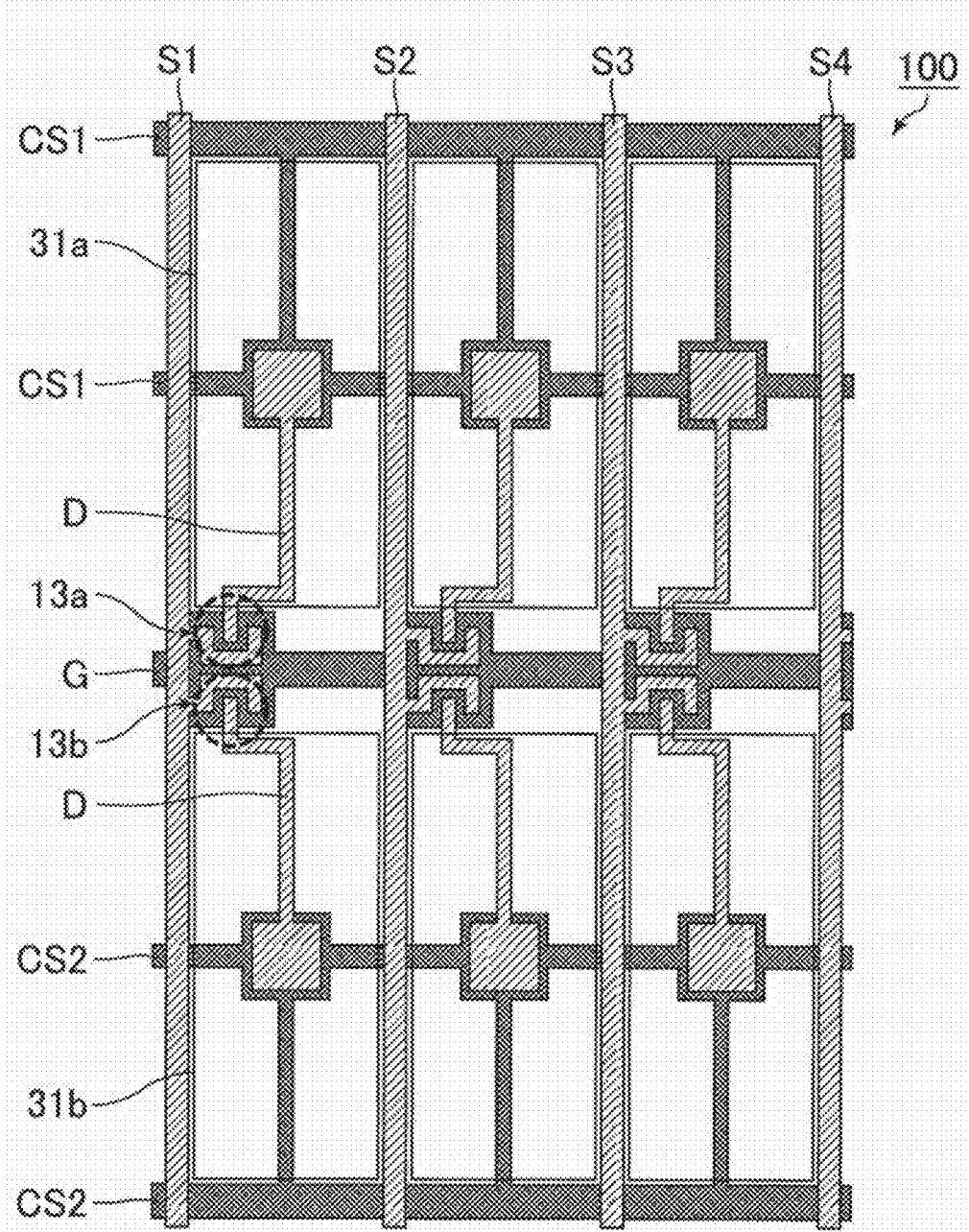
FIG. 13 is a schematic plan view schematically illustrating an exemplary first substrate.
Figure 14:
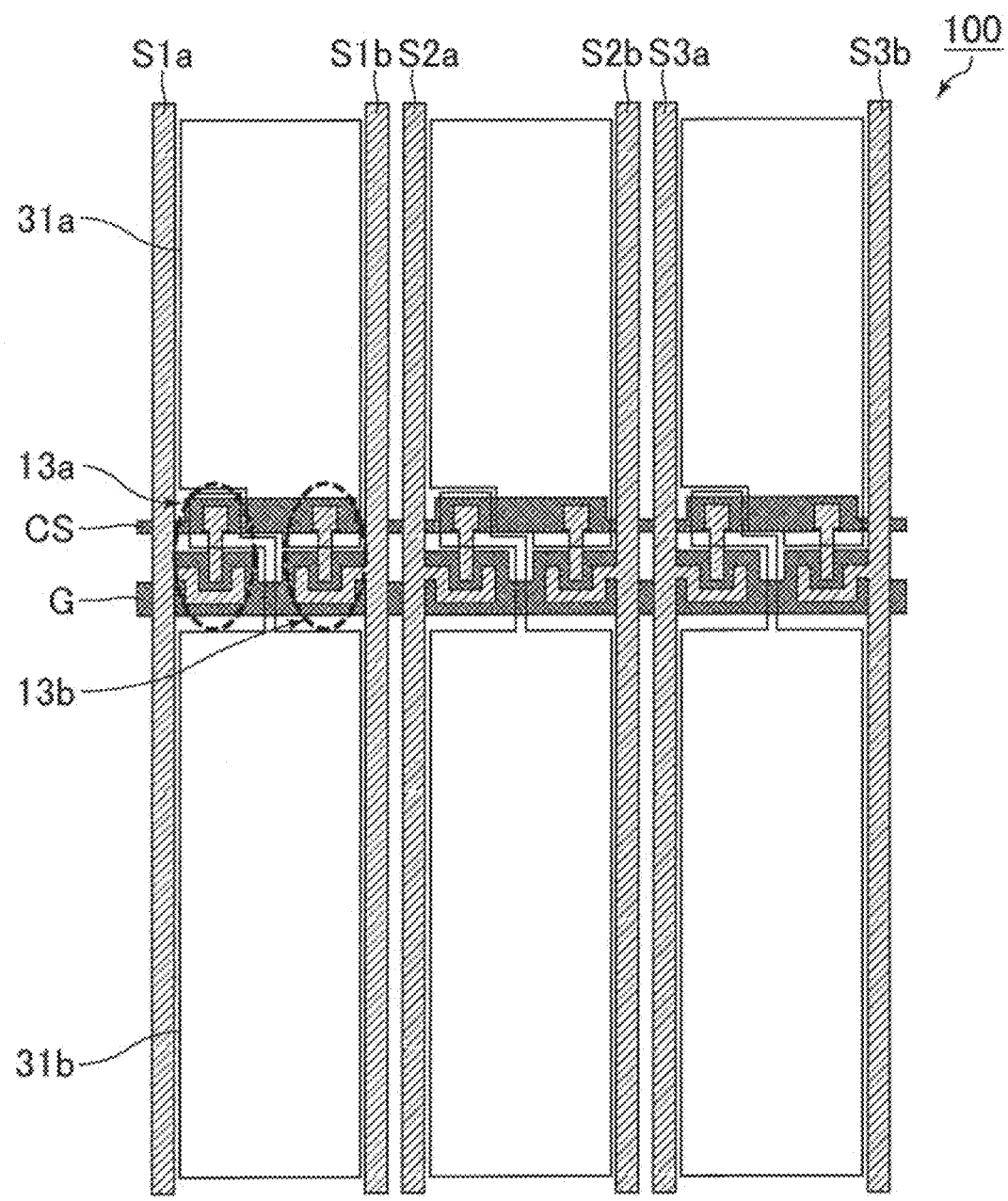
FIG. 14 is a schematic plan view schematically illustrating an exemplary first substrate.
Figure 15:
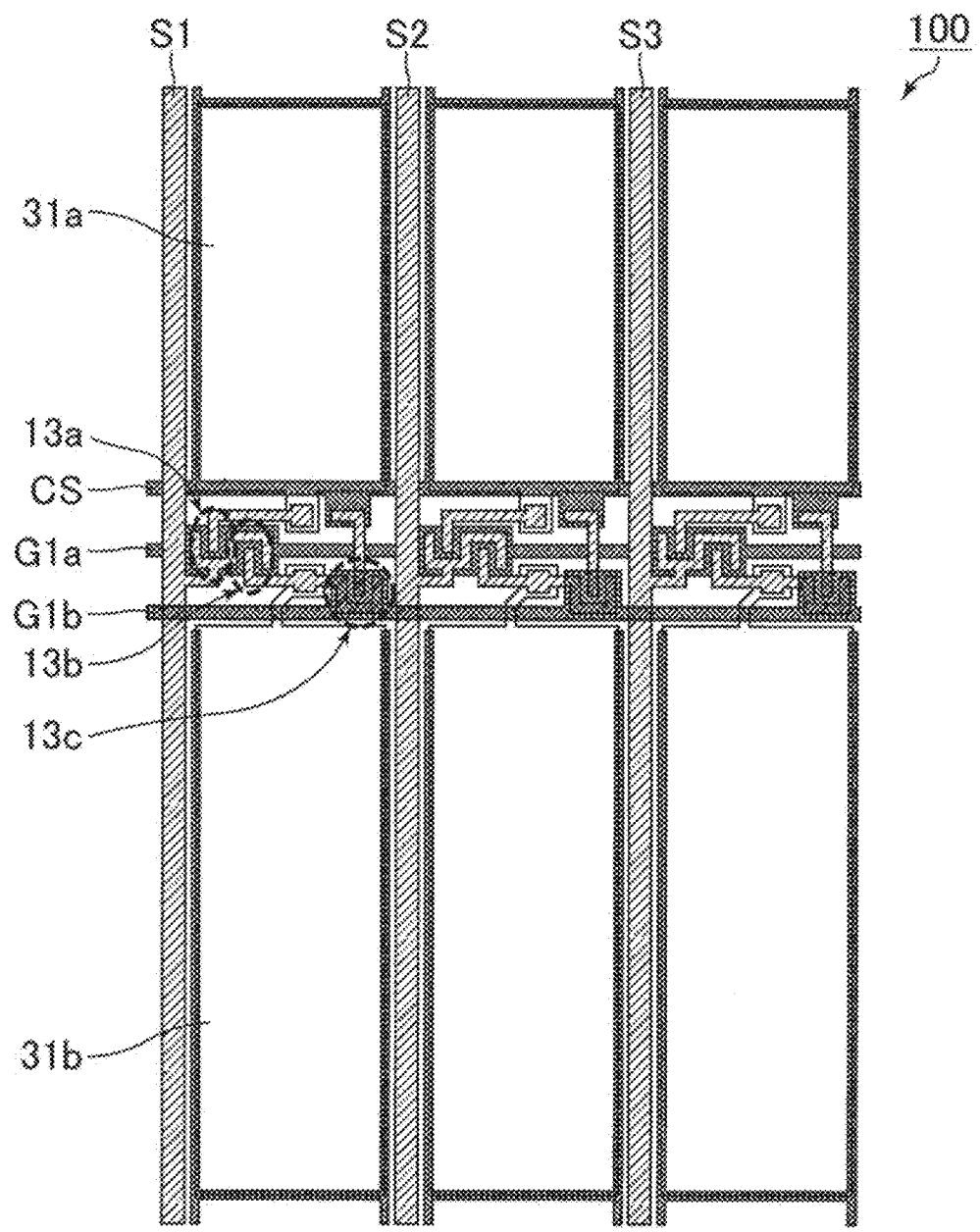
FIG. 15 is a schematic plan view schematically illustrating an exemplary first substrate.

FIGS. 13 to 15 are each a schematic plan view schematically illustrating an exemplary first the substrate. As illustrated in FIGS. 13 to 15, each pixel includes two alignment divided parts, and signals may be transferred to the first pixel electrode 31a and the second pixel electrode 31b through TFTs 13a and 13b different from each other.

As illustrated in FIG. 13, for example, one gate signal line G may be disposed through the center of the pixel in the transverse direction of the pixel, and multiple source signal lines S1, S2, S3, and S4 may be disposed orthogonally to the gate signal line G. Capacitance lines CS1 and CS2 may be disposed in parallel to the gate signal line G. Two TFTs 13a and 13b may be disposed at the intersection point between the gate signal line G and the source signal line S1. A drain line D connected with the TFT 13a may be electrically connected with the first pixel electrode 31a when the TFT 13a is on, and a drain line D connected with the TFT 13b may be electrically connected with the second pixel electrode 31b when the TFT 13b is on. In addition, the capacitance line CS1 may be formed at a position where the drain line D connected with the TFT 13a is connected with the first pixel electrode 31a, and the capacitance line CS2 may be formed at a position where the drain line D connected with the TFT 13b is connected with the second pixel electrode 31b. The capacitance lines CS1 and CS2 are each preferably disposed through the center of a half of the pixel in the transverse direction of the pixel. When the capacitance lines CS1 and CS2 are each formed to overlap with the boundary between two adjacent alignment regions, the dark line is made difficult to observe As illustrated in FIG. 14, for example, one gate signal line G may be disposed through the center of each pixel in the transverse direction of the pixel, and multiple source signal lines S1a, S1b, S2a, S2b, S3a, and S3b may be disposed orthogonally to the gate signal line G, or one gate signal line G and two source signal lines may be disposed in each pixel. A capacitance line CS may be disposed in parallel to the gate signal line G. A TFT 13a may be disposed at the intersection point between the gate signal line G and the source signal line S1a, and a TFT 13b may be disposed at the intersection point between the gate signal line G and the source signal line S1b. A drain line connected with the TFT 13a may be electrically connected with the second pixel electrode 31b when the TFT 13a is on, and a drain line connected with the TFT 13b may be electrically connected with the first pixel electrode 31a when the TFT 13b is on. In addition, capacitance lines CS may be formed at a position where the drain line connected with the TFT 13a is connected with the second pixel electrode 31b, and a position where the drain line connected with the TFT 13b is connected with the first pixel electrode 31a.

As illustrated in FIG. 15, for example, two gate signal lines G1a and G1b may be disposed through the center of each pixel in the transverse direction of the pixel, and multiple source signal lines S1, S2, and S3 may be disposed orthogonally to the gate signal lines G1a and G1b. One pixel may include three TFTs 13a, 13b, and 13c. The TFT 13a and the TFT 13b may be disposed at the intersection point between the gate signal line G1a and the source signal line S1. A drain line connected with the TFT 13a may be electrically connected with the first pixel electrode 31a when the TFT 13a is on, and a drain line connected with the TFT 13b may be electrically connected with the second pixel electrode 31b when the TFT 13b is on. In addition, a TFT 13c may be formed between the drain line connected with the TFT 13b and the gate signal line G1b, and a drain line connected with the TFT 13c may be connected with a capacitance line CS.

The second substrate 50B includes the counter electrode 51 and may be, for example, a color filter substrate (CF substrate). The color filter substrate may be a color filter substrate that is typically used in the field of liquid crystal display devices.

The configuration of the color filter substrate is, for example, a configuration in which a black matrix formed in a lattice, and a color filter formed inside each grid, in other words, each pixel are provided on a transparent substrate. The black matrix may be formed in a lattice for each pixel in a manner overlapping with the boundary of the pixel, and may be further formed in a lattice for each half of the pixel through the center of the pixel in the transverse direction. When the black matrix is formed in a manner overlapping with a region in which a dark line is generated, the dark line is made difficult to observe.

The counter electrode 51 is disposed facing to the pixel electrode 31 through the liquid crystal layer 40. Display can be performed by forming a vertical electric field between the counter electrode 51 and the pixel electrode 31 to tilt the liquid crystal molecules 41. For example, the color filters may be disposed on each column in the order of red (R), green (G), and blue (B), the order of yellow (Y), red (R), green (G), and blue (B), or the order red (R), green (G), blue (B), and green (G).

The counter electrode 51 is preferably a planar electrode. The counter electrode 51 may be a transparent electrode made of, for example, a transparent conductive material such as indium tin oxide (ITO), indium zinc oxide (IZO), zinc oxide (ZnO), or tin oxide (SnO), or an alloy thereof.

The photo alignment films 70 are provided between the first substrate 10B and the liquid crystal layer 40 and between the second substrate 50B and the liquid crystal layer 40. Each photo alignment film 70 has the function of controlling alignment of the liquid crystal molecules 41 in the liquid crystal layer 40 as described above. When voltage applied to the liquid crystal layer 40 is lower than a threshold voltage (including no voltage application), alignment of the liquid crystal molecules 41 in the liquid crystal layer 40 is controlled mainly by the function of the photo alignment film 70.

Each photo alignment film 70 may be a film (horizontal alignment film) that substantially horizontally aligns liquid crystal compounds in the liquid crystal layer 40, or a film (vertical alignment film) that substantially vertically aligns liquid crystal compounds in the liquid crystal layer 40. In a case of the horizontal alignment film, the substantially horizontal alignment preferably has a pre-tilt angle of 0° or greater and 5° or smaller. In a case of the vertical alignment film, the substantially vertical alignment preferably has a pre-tilt angle of 85° or greater and 90° or smaller. In this manner, the present embodiment is applicable to both of a horizontal alignment mode liquid crystal display device and a vertical alignment mode liquid crystal display device.

The photo alignment film 70 is made of a light alignment property material. The light alignment property material is a material that has a structural change when irradiated with light (electromagnetic wave) such as ultraviolet light to develop the property (alignment restraining force) of restraining alignment of the liquid crystal molecules 41 nearby, or a material in which the magnitude and/or direction of the alignment restraining force changes. The light alignment property material is, for example, a material having a photoreaction site where reaction such as dimerization (dimer formation), isomerization, or photo-Fries transition, disassembly occurs due to light irradiation. Examples of photoreaction sites (functional groups) that dimerize and isomerize due to light irradiation include cinnamate, chalcone, coumarin, and stilbene. Examples of photoreaction sites (functional groups) that isomerizes due to light irradiation include azobenzene. Examples of photoreaction sites that photo-Fries-transits due to light irradiation include a phenol ester structure. Examples of photoreaction sites that decompose due to light irradiation include a cyclobutene structure. The photo alignment film 70 preferably contains a polymer selected from the group consisting of polyamic acid, polyimide, polysiloxane, polyvinyl, and polymaleimide.

The tilt orientation of the liquid crystal molecules 41 can be provided by performing alignment treatment on the photo alignment film 70. The light alignment treatment preferably involves irradiation of light (electromagnetic wave) such as ultraviolet light.

A first polarizing plate 20 may be disposed on a side of the first substrate 10B opposite to the liquid crystal layer 40, and a second polarizing plate 60 may be disposed on a side of the second substrate 50B opposite to the liquid crystal layer 40. The polarization axis may be the absorption axis of each polarizing plate or the transmission axis thereof. The first polarizing plate 20 and the second polarizing plate 60 are typically polyvinyl alcohol (PVA) films on which an anisotropic material such as a dichroic iodine complex is adsorbed and aligned. Typically, a protection film such as a triacetyl cellulose film is laminated on both surfaces of the PVA film in practical use. An optical film such as a phase difference film may be disposed between the first polarizing plate 20 and the first substrate 10B and between the second polarizing plate 60 and the second substrate 50B.

Typically in the liquid crystal display device 100 according to the present embodiment, the first substrate 10B and the second substrate 50B are bonded to each other through the sealing material 80 provided so as to surround the liquid crystal layer 40, and the liquid crystal layer 40 is held in a predetermined region. The sealing material 80 may be, for example, an epoxy resin containing an inorganic filler or an organic filler, and a hardening agent.

In the liquid crystal display device according to the present embodiment, a backlight may be disposed on a back surface side. A liquid crystal display device having such a configuration is typically called a transmissive liquid crystal display device. The backlight is not particularly limited and may be any device configured to emit light including visible light, and may be configured to emit light including visible light only or light including both of visible light and ultraviolet light. A backlight capable of emitting white light is preferably used to achieve color display of the liquid crystal display device. The kind of the backlight is preferably, for example, a light-emitting diode (LED). In the present specification, "visible light" is light (electromagnetic wave) having a wavelength of 380 nm or longer and 800 nm or shorter.

The liquid crystal display device according to the present embodiment further includes multiple members such as: an external circuit such as a tape carrier package (TCP) or a printed-circuit board (PCB); an optical film such as a viewing angle increase film or a luminance improvement film; and a bezel (frame), and some of the members may be incorporated in another member. Any member other than the members described above is not particularly limited, and may be a member that is typically used in the field of liquid crystal display devices, and thus description thereof is omitted.

The display mode of the liquid crystal display device 100 according to the present embodiment is not particularly limited, and may be, for example, a twisted nematic (TN) mode, an electrically controlled birefringence (ECB) mode, an in-plane switching (IPS) mode, a fringe field switching (FFS) mode, a vertical alignment (VA) mode, or a vertical alignment twisted nematic (VATN) mode.

Although the embodiments of the present invention have been described above, all the individual matters described can be applied to the whole of the present invention.

Hereinafter, the present invention will be described in more detail with reference to examples, but the present invention is not limited to only these examples.

Example 1

Figure 16:
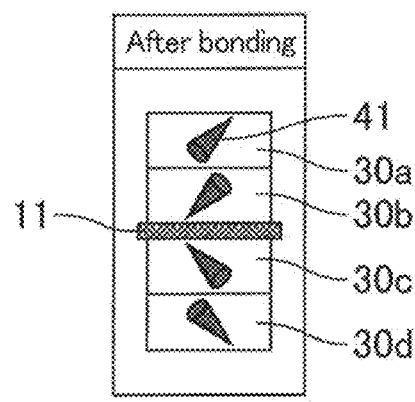
FIG. 16 is a schematic plan view illustrating a 4D-ECB alignment liquid crystal display device produced in Example 1.

In Example 1, a 4D-ECB alignment liquid crystal display device according to Embodiment 3 was produced by using the method for manufacturing a liquid crystal display device according to Embodiment 2, in other words, by using the polarized light irradiation device according to Embodiment 1. FIG. 16 is a schematic plan view illustrating the 4D-ECB alignment liquid crystal display device produced in Example 1. In FIG. 16, arrows and circular cones each represent the alignment azimuth of liquid crystal molecules, and an observer is on the bottom surface side of the circular cone.

To produce the 4D-ECB alignment liquid crystal display device, an irradiation condition for achieving the liquid crystal alignment azimuth angle θ of 45° was first discussed in Example 1. The incident angle of ultraviolet light was set to be 30°, the extinction ratio of the polarizer was set to be 100:1, and a vertical alignment photo alignment film was used. Then, the alignment azimuth angle θ of liquid crystal molecules was measured while the polarization azimuth angle α of the polarizer was changed in the range of 45° to 57°. As a result, the alignment azimuth angle θ of liquid crystal molecules could be set to be 45° when the polarization azimuth angle α of the polarizer was 51°. The extinction ratio of the polarizer was obtained by using a Glan-laser prism having an extinction ratio of $5 \times 10^{-5}$.

Subsequently, the polarization azimuth angle α of the polarizer was set to be 51°, the incident angle of ultraviolet light was set to be 30°, and the extinction ratio of the polarizer was set to be 100:1. Then, vertical alignment photo alignment films provided on a TFT substrate (first substrate) and a counter substrate (second substrate) were irradiated with polarized light. The polarized light irradiation was performed while changing the substrate conveyance direction and the light irradiation direction to directions illustrated in FIG. 16, and the polarized light irradiation was repeated four times for each of the TFT substrate and the counter substrate. Subsequently, the TFT substrate and the counter substrate subjected to the polarized light irradiation were bonded to each other, and a liquid crystal layer was provided between both substrates, and thus the production of the 4D-ECB alignment liquid crystal display device was produced.

The 4D-ECB alignment liquid crystal display device produced in Example 1 had four regions (the first alignment region 30a, the second alignment region 30b, the third alignment region 30c, and the fourth alignment region 30d) between which the alignment azimuth of the liquid crystal molecules 41 is different, and the signal line 11 was provided between the second alignment region 30b and the third alignment region 30c.

Example 2

Figure 17:
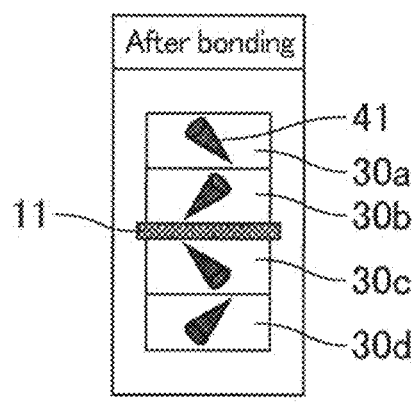
FIG. 17 is a schematic plan view illustrating a 4D-ECB alignment liquid crystal display device produced in Example 2.

FIG. 17 is a schematic plan view illustrating a 4D-ECB alignment liquid crystal display device produced in Example 2. In FIG. 16, arrows and circular cones each represent the alignment azimuth of liquid crystal molecules, and an observer is on the bottom surface side of the circular cone. The 4D-ECB alignment liquid crystal display device of Example 2 was produced by a method same as that in Example 1 except that the substrate conveyance direction and the light irradiation direction were changed to directions illustrated in FIG. 17 when the first alignment region 30a to the fourth alignment region 30d were formed by polarized light irradiation.

Example 3

Figure 18:
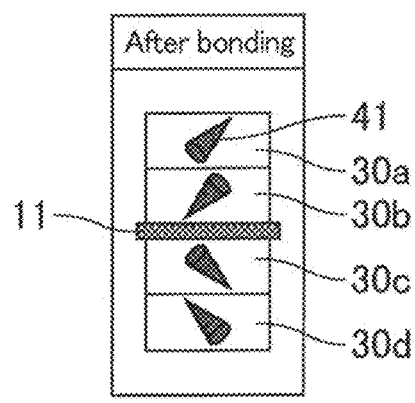
FIG. 18 is a schematic plan view illustrating a 4D-ECB alignment liquid crystal display device produced in Example 3.

FIG. 18 is a schematic plan view illustrating a 4D-ECB alignment liquid crystal display device produced in Example 3. In FIG. 16, arrows and circular cones each represent the alignment azimuth of liquid crystal molecules, and an observer is on the bottom surface side of the circular cone. The 4D-ECB alignment liquid crystal display device of Example 3 was produced by a method same as that in Example 1 except that the substrate conveyance direction and the light irradiation direction were changed to directions illustrated in FIG. 18 when the first alignment region 30a to the fourth alignment region 30d were formed by polarized light irradiation.

Example 4

Figure 19:
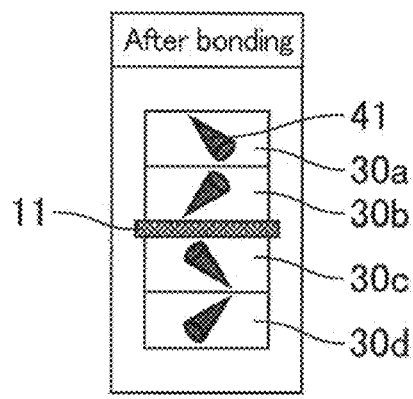
FIG. 19 is a schematic plan view illustrating a 4D-ECB alignment liquid crystal display device produced in Example 4.

FIG. 19 is a schematic plan view illustrating a 4D-ECB alignment liquid crystal display device produced in Example 4. In FIG. 16, arrows and circular cones each represent the alignment azimuth of liquid crystal molecules, and an observer is on the bottom surface side of the circular cone. The 4D-ECB alignment liquid crystal display device of Example 4 was produced by a method same as that in Example 1 except that the substrate conveyance direction and the light irradiation direction were changed to directions illustrated in FIG. 19 when the first alignment region 30a to the fourth alignment region 30d were formed by polarized light irradiation.

Example 5

Figure 20:
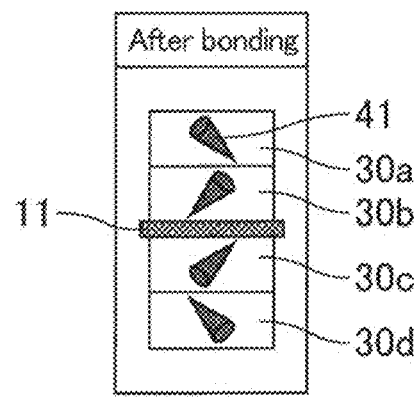
FIG. 20 is a schematic plan view illustrating a 4D-ECB alignment liquid crystal display device produced in Example 5.

FIG. 20 is a schematic plan view illustrating a 4D-ECB alignment liquid crystal display device produced in Example 5. In FIG. 16, arrows and circular cones each represent the alignment azimuth of liquid crystal molecules, and an observer is on the bottom surface side of the circular cone. The 4D-ECB alignment liquid crystal display device of Example 5 was produced by a method same as that in Example 1 except that the substrate conveyance direction and the light irradiation direction were changed to directions illustrated in FIG. 20 when the first alignment region 30a to the fourth alignment region 30d were formed by polarized light irradiation.

Example 6

Figure 21:
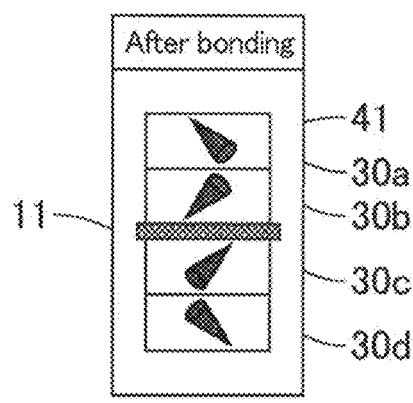
FIG. 21 is a schematic plan view illustrating a 4D-ECB alignment liquid crystal display device produced in Example 6.
Figure 22:
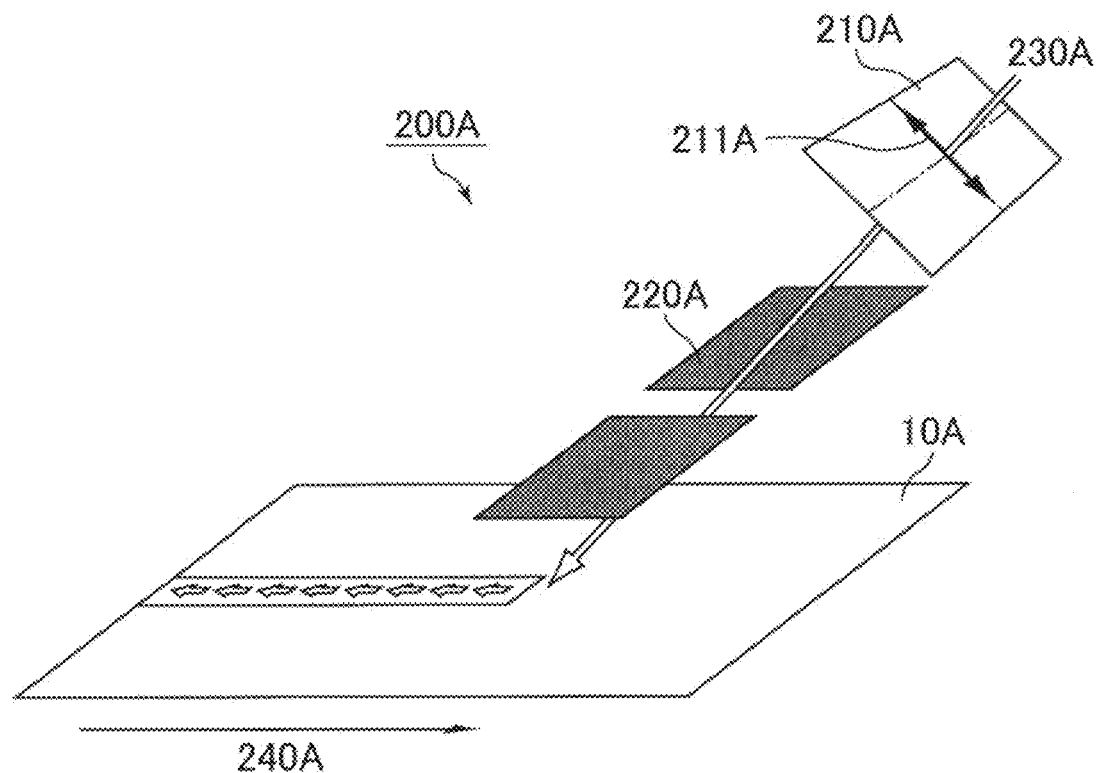
FIG. 22 is a perspective pattern diagram illustrating the situation of polarized light irradiation by a polarized light irradiation device according to Comparative Example 1.
Figure 23:
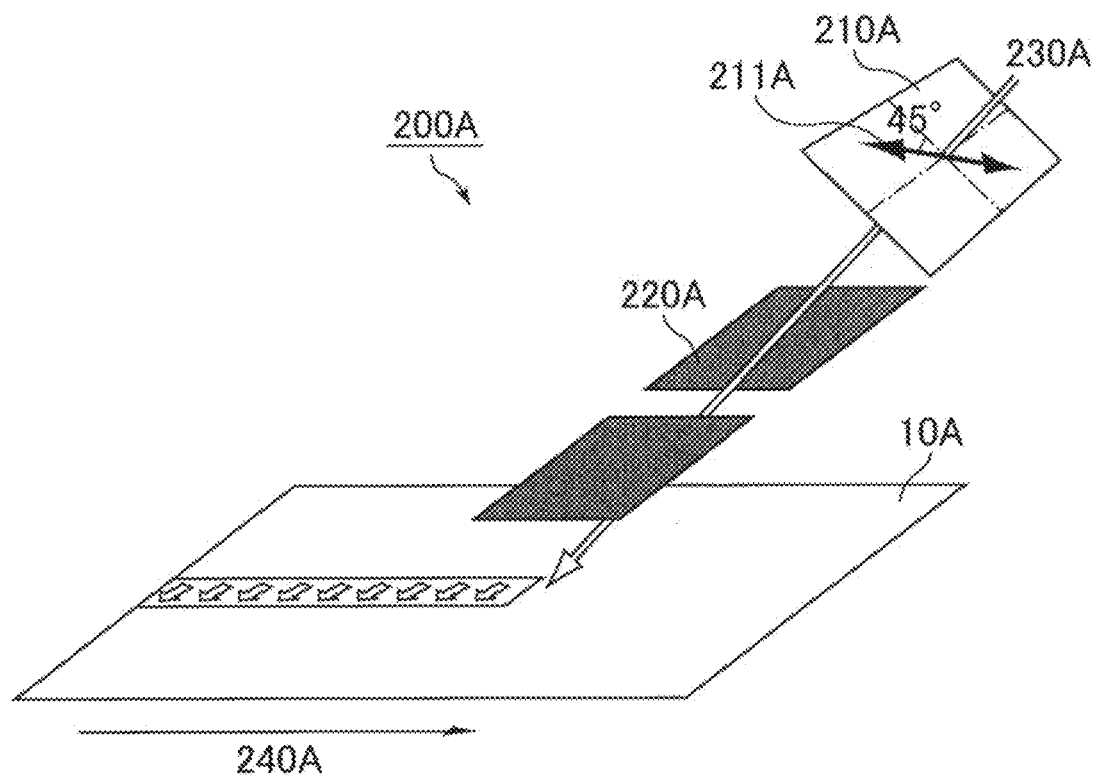
FIG. 23 is a perspective pattern diagram illustrating the situation of polarized light irradiation by a polarized light irradiation device according to Comparative Example 2.

FIG. 21 is a schematic plan view illustrating a 4D-ECB alignment liquid crystal display device produced in Example 6. In FIG. 16, arrows and circular cones each represent the alignment azimuth of liquid crystal molecules, and an observer is on the bottom surface side of the circular cone. The 4D-ECB alignment liquid crystal display device of Example 6 was produced by a method same as that in Example 1 except that the substrate conveyance direction and the light irradiation direction were changed to directions illustrated in FIG. 21 when the first alignment region 30a to the fourth alignment region 30d were formed by polarized light irradiation.

These embodiments of the present invention described above may appropriately be combined within the spirit of the present invention.

Additional Remarks

An aspect of the present invention may be the polarized light irradiation device 200 used in alignment treatment of the photo alignment film 70 provided on the substrate 10. The polarized light irradiation device 200 includes the stage 250 including the placement surface 251 on which the substrate 10 is placed, and the polarized light irradiation unit 260 configured to irradiate the placement surface 251 with polarized light through the polarizer 210 in a direction tilted relative to the normal of the placement surface 251. The polarization azimuth angle α as the angle of the polarization axis 211 of the polarizer 210 when the polarization axis 211 of the polarizer 210 is projected onto the placement surface 251 satisfies 30°<α<45°, 45°<α<60°, −60°<α<−45°, or −45°<α<−30°, when viewed in the irradiation axis direction of the polarized light with the longitudinal direction of the substrate 10 taken to be 0°. With this configuration, the alignment azimuth angle θ of liquid crystal molecules can be set to be a desired angle even when the incident angle of polarized light on the substrate 10 is not 0° at irradiation of the photo alignment film 70 with polarized light.

In an aspect of the present invention, the angle of the tilted direction may be 30° or greater and 60° or smaller relative to the normal of the placement surface 251. With this configuration, the alignment azimuth angle θ of liquid crystal molecules can be set to be ±45°.

In an aspect of the present invention, the extinction ratio of the polarizer 210 may be 50:1 to 500:1. With this configuration, the alignment azimuth angle θ of liquid crystal molecules can be set to be ±45°.

In an aspect of the present invention, the polarized light with which the placement surface 251 is irradiated may have an accumulated exposure amount of 10 mJ/cm$^2$ or more and 100 mJ/cm$^2$ or less. With this configuration, the alignment azimuth angle θ of liquid crystal molecules can be set to be ±45°.

In an aspect of the present invention, the stage 250 may include the conveyance mechanism configured to convey the substrate 10. With this configuration, the photo alignment film 70 can be irradiated with polarized light while conveying the substrate 10 provided with the photo alignment film 70, for example, in the conveyance direction 240.

Another aspect of the present invention may be a method for manufacturing a liquid crystal display device, the method including the photo alignment film formation process of providing the photo alignment film 70 on the surface of at least one of the first substrate 10B and the second substrate 50B, and at least one polarized light irradiation process of irradiating the photo alignment film 70 with polarized light. The polarized light irradiation process irradiates the photo alignment film 70 with polarized light through the polarizer 210 in a direction tilted relative to the normal of the surface. The polarization azimuth angle α as the angle of the polarization axis 211 of the polarizer 210 when the polarization axis 211 of the polarizer 210 is projected onto the substrate satisfies 30°<α<45°, 45°<α<60°, −60°<α<−45°, or −45°<α<−30°, when viewed in an irradiation axis direction of the polarized light with the longitudinal direction of the substrate (at least one of the first substrate 10B and the second substrate 50B) taken to be 0°. With this configuration, the alignment azimuth angle θ of liquid crystal molecules can be set to be a desired angle even when the incident angle of polarized light on the substrate is not 0° at irradiation of the photo alignment film 70 with polarized light.

In the other aspect of the present invention, in the polarized light irradiation process, the photo alignment film 70 may be irradiated with polarized light while conveying the substrate.

In the other aspect of the present invention, the method for manufacturing a liquid crystal display device may include the multiple polarized light irradiation processes, and at least one of the polarization azimuth angle α and the conveyance direction of the substrate may be different between at least two of the polarized light irradiation processes. With this configuration, it is possible to more easily produce a liquid crystal display device having a divided alignment structure.

In the other aspect of the present invention, the polarization azimuth angle α may be different between at least two of the polarized light irradiation processes.

In the other aspect of the present invention, the conveyance direction of the substrate may be different between at least two of the polarized light irradiation processes.

REFERENCE SIGNS LIST 10, 10A: substrate
10B: first substrate
11: signal line
13, 13a, 13b, 13c: TFT
20: first polarizing plate
30: pixel
30a: first alignment region
30b: second alignment region
30c: third alignment region
30d: fourth alignment region
31: pixel electrode
31a: first pixel electrode
31b: second pixel electrode
40: liquid crystal layer
41: liquid crystal molecule
50B: second substrate
51: counter electrode
60: second polarizing plate
70: photo alignment film
80: sealing material
91: substrate longitudinal direction
92: substrate transverse direction
100: liquid crystal display device
200, 200A: polarized light irradiation device
210, 210A: polarizer
211, 211A: polarizer polarization axis
212: polarizer polarization axis projected onto substrate
213: polarized light irradiation azimuth
214: liquid crystal molecule alignment azimuth
220, 220A: light-shielding mask
230, 230A: ultraviolet light
240, 240A: conveyance direction
250: stage
251: placement surface
260: polarized light irradiation unit
α: polarizer polarization azimuth angle
α1: long-axis component polarization axis
α2: short-axis component polarization axis
φ: substrate irradiation azimuth angle
θ: liquid crystal molecules alignment azimuth angle
CS, CS1, CS2: capacitance line
D: drain line
G, G1a, G1b: gate signal line
S1, S2, S3, S4, S1a, S1b, S2a, S2b, S3a, S3b: source signal line

The invention claimed is:

1. A method for manufacturing a liquid crystal display device, the method comprising:
a photo alignment film formation process of providing a photo alignment film on a surface of at least one substrate selected from a first substrate and a second substrate; and
a plurality of polarized light irradiation processes of irradiating the photo alignment film with polarized light, wherein the plurality of polarized light irradiation processes irradiate the photo alignment film with polarized light through a polarizer in a conveying direction tilted relative to the normal of the surface while conveying the at least one substrate, a polarization azimuth angle $\alpha$, which is an angle of a polarization axis of the polarizer when the polarization axis of the polarizer is projected onto the at least one substrate, satisfies $30°<\alpha<45°$, $45°<\alpha<60°$, $-60°<\alpha<-45°$, or $-45°<\alpha<-30°$, as viewed in an irradiation axis direction of the polarized light with a longitudinal direction of the at least one substrate is $0°$, wherein at least one of a and a conveyance direction of the at least one substrate is different between at least two of the plurality of polarized light irradiation processes.

2. The method for manufacturing a liquid crystal display device according to claim 1, wherein $\alpha$ is different between at least two of the plurality of polarized light irradiation processes.

3. The method for manufacturing a liquid crystal display device according to claim 1, wherein the conveyance direction of the substrate is different between at least two of the plurality of polarized light irradiation processes.

* * * * *